United States Patent [19]
Wagenblast et al.

[11] Patent Number: 5,097,463
[45] Date of Patent: Mar. 17, 1992

[54] LASER-OPTICAL WRITING AND READING PROCESS USING A THERMALLY ALTERABLE READING LAYER CONTAINING LIQUID-CRYSTALLINE COMPOUND

[75] Inventors: Gerhard Wagenblast; Karl-Heinz Etzbach, both of Frankenthal; Bernd Hisgen, Limburgerhof, all of Fed. Rep. of Germany

[73] Assignee: BASF Aktiengesellschaft, Ludwigshafen, Fed. Rep. of Germany

[21] Appl. No.: 154,592

[22] Filed: Feb. 10, 1988

[30] Foreign Application Priority Data

Feb. 11, 1987 [DE] Fed. Rep. of Germany ....... 3704146

[51] Int. Cl.$^5$ ................................................. G11B 7/00
[52] U.S. Cl. ..................................................... 369/110
[58] Field of Search ............................ 428/1; 346/1.1; 365/108; 350/330 R, 351, 370, 375, 376, 406; 369/110, 275, 284, 13, 100; 360/114

[56] References Cited

U.S. PATENT DOCUMENTS

| 2,766,659 | 10/1956 | Baerwald | 369/110 X |
| 4,160,270 | 7/1979 | Goldschmidt et al. | 369/110 X |
| 4,405,993 | 9/1983 | Kahn et al. | 365/108 |
| 4,577,306 | 3/1986 | Howe et al. | 369/100 |
| 4,586,092 | 4/1986 | Martens et al. | 369/13 X |
| 4,612,587 | 9/1986 | Kaneko et al. | 360/114 X |
| 4,702,945 | 10/1987 | Etzbach et al. | 350/330 X |
| 4,729,122 | 3/1988 | Itoh | 369/110 X |
| 4,752,820 | 6/1988 | Kuroiwa et al. | 365/108 |
| 4,833,043 | 5/1989 | Gardner | 369/13 X |

FOREIGN PATENT DOCUMENTS 55-76321 6/1980 Japan ................................. 350/376
63-267912 11/1988 Japan ................................. 350/370

OTHER PUBLICATIONS

H. Birecki et al. Erasable Optical Liquid Crystal Disc. Memory Proceedings of SPIE, vol. 420, 1983, Jun. 6-10, Optical Storage Media, Washington.
Urabe et al., Laser-Address Liquid Crystal Light Valve with Dichroic Dye Added as a Laser Beam Absorber, J. Appl. Phys. 54, (3), Mar. 1983, pp. 1152-1558.
Shibaev et al. Thermotropic Liquid-Crystalline Polymers:14, Thermo-Recording on Liquid-Crystalline Polymers with the Aid of a Laser Beam, Polymer Communications, 1983, vol. 24, Dec. 1983, pp. 364-365.
Coles et al., High-Resolution Laser-Addressed Liquid Crystal Polymer Storage Displays, Polymer, 1985, vol. 26, Nov. 1985, pp. 1801-1806.

Primary Examiner—Donald McElheny, Jr.
Attorney, Agent, or Firm—Keil & Weinkauf

[57] ABSTRACT

A laser-optical write and read process whereby a thermally alterable recording layer which contains liquid-crystalline compounds in homogeneous planar orientation and forms part of a multilayer, sheet-like recording material is written by means of a write laser beam with analogue or digital data in the form of thermally altered areas, whereafter the written data are read by means of a read laser beam, including: analyzing the light transmitted or reflected by the recording material, and reading the data by determining the polarization-optical contrast between the thermally altered and the unaltered areas and/or utilizing for this purpose the interference of the light rays which form from the laser lightwaves in a Gaussian intensity distribution owing to the different phase velocities of the light in the center of thermally altered areas on the one hand and their thermally unaltered surroundings on the other.

17 Claims, 2 Drawing Sheets

LASER-OPTICAL WRITING AND READING PROCESS USING A THERMALLY ALTERABLE READING LAYER CONTAINING LIQUID-CRYSTALLINE COMPOUND

The present invention relates to a novel, improved, laser-optical write and read process whereby a thermally alterable recording layer which contains liquid-crystalline compounds in homogeneous planar orientation and forms part of a multilayer, sheetlike recording material is written by means of a write laser beam with analogue or digital data in the form of thermally altered areas, whereafter the written data are read by means of a read laser beam by analyzing the light transmitted or reflected by the recording material.

The present invention also relates to novel laser-optical write and read instruments which contain essentially a disk drive and a laser-optical write and read head and with the aid of which the novel process can be carried out particularly efficiently.

The present invention further relates to novel, multilayer, laser-optical data disks which are particularly suitable for the process according to the invention.

Liquid-crystalline compounds can form liquid-crystalline phases. The latter are optically anisotropic liquids in which there is long-range ordering among the molecules, which is not the case in normal liquids. For this reason, on melting, a solid liquid-crystalline compound first forms a liquid-crystalline liquid phase, for example a smectic phase, which, with a further increase in temperature, turns at a certain phase transition temperature either into a further, for example nematic, liquid-crystalline phase or into an optically isotropic melt. If the melt is cooled down again, the liquid-crystalline phases and eventually the crystalline state reappear at the corresponding transition temperatures. However, in the case of polymers having mesogenic groups, i.e. groups which are derived from liquid-crystalline compounds, it is possible to freeze the liquid-crystalline state once it has been produced, by cooling the liquid-crystalline polymer melt to below a certain temperature, for example the glass transition temperature Tg of the polymer, the result being an optically anisotropic solid which, however, is not crystalline but glassy.

Liquid-crystalline phases are readily detectable in melts or in the frozen state on account of their optical anisotropy. For instance, viewed under a polarizing microscope through crossed polarizers they show birefringent textures, while isotropic melts in this setting extinguish the light and therefore appear black.

Layers which contain liquid-crystalline compounds can therefore be used for recording information by producing in these layers, by local heating, areas having altered optical properties. After cooling, these areas, provided they are then still stable, can be detected, i.e. read.

EP-A-0,171,045 reveals that it is possible to write data in the form of thermally altered areas into a recording layer of liquid-crystalline polymers in homogeneous planar orientation and solidified in glass form by local heating with a laser beam. Compared with the original state, these areas show altered light scattering, optical activity, birefringence and/or absorption, from which they can be identified. The patent specification in question does not reveal what has to be done in detail to arrive at a process for laser-optical data recording superior to that of the prior art.

Homogeneously planar orientation is here to be understood as meaning the uniform alignment of the liquid-crystalline groups or compounds in a layer parallel or almost parallel to the plane of the layer. If an alignment perpendicular or substantially perpendicular to the plane of the layer is present, the orientation is referred to as homeotropic. Non-liquid-crystalline additives or non-liquid-crystalline groups additionally present can likewise become coaligned in a corresponding manner in an oriented layer.

Laser-optical write and read instruments are likewise known. They contain essentially a disk drive and a laser-optical write and read head and, in addition, mechanical servo means for correcting the track position, autofocusing means, optical elements for analyzing track positioning or autofocusing errors, detector means having interposed interference filters for detecting the read laser light reflected by the recording materials, and suitable electronic components.

In general, the laser-optical write and read instrument has the following components:

a laser light source for laser light of a wavelength $\lambda_1$ which is readily absorbed by the recording layer in question, or two laser light sources for laser light of two different wavelengths $\lambda_1$ and $\lambda_2$, the laser light of wavelength $\lambda_2$ being absorbed only poorly, if at all, by the recording layer in question, a dielectric beam splitter which serves to combine or separate beams of different wavelengths $\lambda$ a polarizing beam splitter or a beam splitter whose action is substantially independent of the polarization of the incident light, and a $\lambda/4$ plate.

Laser-optical write and read instruments of this type serve to write and read laser-optical data disks containing recording layers based on highly reflective, thermally deformable or magneto-optical materials into which the data are written in the form of holes (ablative recording), pits (deformative recording) or remagnetized areas (magneto-optical recording). The written data are then read with the aid of a laser beam by utilizing the different reflectivities of the holes and the unwritten areas (ablative recording), the light scattering at the pits (deformative recording) or the different rotation of the plane of polarization $\bar{E}$ of the laser light by oppositely magnetized areas (magneto-optical recording).

All instruments have in common that the angle between the plane of polarization $\bar{E}$ of the laser beams emitted by the laser optical head and the data track is fixed in advance and cannot subsequently be changed. In addition, the existing instruments are designed for the recording principles mentioned; they are therefore very difficult to use, if they can be used at all, for writing and reading recording materials having recording layers based on liquid-crystalline compounds in homogeneous planar orientation, so that they do not exploit the inherent advantages of these recording materials either.

Although multilayer, sheetlike, laser-optical recording materials having a thermally alterable recording layer containing liquid-crystalline compounds in homogeneous planar orientation are known, the prior art reveals nothing about corresponding data disks. It is true that the paper by H. Birecki et al., "Erasable Optical Liquid Crystal Disk Memory", in Proceedings of SPIE, volume 420, June 4 to 6, Optical Storage Media, Washington 1983, pages 194 to 199, reveals a multilayer laser-optical data disk whose recording layer, however, contains homeotropically oriented liquid-crystalline compounds. However, the data are written into this data disk in the form of light-scattering areas, and it is stated that only homeotropically oriented layers are suitable for this purpose. Furthermore, the paper by T. Urabe et al., "Laser-addressed liquid crystal light valve with dichroic dye added as a laser beam absorber", in J. Appl. Phys. 54 (March 1983), no. 3, 1522-88, reveals a prejudice against recording materials having liquid-crystalline recording layers in homogeneous planar orientation which is only reinforced by the paper by V. P. Shibaev et al., "Thermotropic liquid-crystalline polymers: 14. Thermorecording on liquid-crystalline polymers with the aid of a laser beam", in Polymer Communications, vol. 24, December 1983, pages 364 to 365, and by H. J. Coles et al., "High-resolution laser-addressed liquid crystal polymer storage displays", in Polymer, 26 (November 1985) 1801-06, since they exclusively concern homeotropically oriented recording layers and do not consider those in homogeneous planar orientation at all.

In addition, the laser optical data disk of H. Birecki et al., has disadvantages in respect of optical contrast, write and read speed, error rate and manufacturability. Moreover, to read the written data a technically complicated dark field optical system is required, and the weak signal makes it necessary to use a photomultiplier as detector. Furthermore, the long-term stability of the written data disk is unsatisfactory, which results in a loss of information on prolonged storage.

It is an object of the present invention to find a new improved laser-optical write and read process whereby a thermally alterable recording layer which contains liquid-crystalline compounds in homogeneous planar orientation and forms part of a multilayer, sheetlike recording material is written by means of a write laser beam with analogue or digital data in the form of thermally altered areas, whereafter the written data are read by means of a read laser beam by analyzing the light transmitted or reflected by the recording material. The new process shall be superior to the prior art in respect of write and read speed and in obtainable sensitivity and lead to a lower error rate. In addition, it shall make it possible to detect misinformation and offer adaptability to predetermined technical boundary conditions.

It is a further object of the present invention to find a laser-optical write and read instrument with the aid of which such a new process can be carried out in a particularly advantageous manner.

It is another object of the present invention to find multilayer, laser-optical data disks which are substantially errorlessly writable and readable particularly rapidly using low laser power, have a particularly high optical contrast and are simple to manufacture. In addition, such data disks shall also be stable for a long time in the written state without loss of information. Furthermore, they should be particularly highly suitable for a new process carried out with the aid of new laser-optical instruments.

We have found that these objects are achieved with a novel laser optical write and read process whereby a thermally alterable recording layer which contains liquid-crystalline compounds in homogeneous planar orientation and forms part of a multilayer, sheetlike recording material is written by means of a write laser beam with analogue or digital data in the form of thermally altered areas, whereafter the written data are read by means of a read laser beam by analyzing the light transmitted or reflected by the recording material.

The novel processes comprises a) reading the data by determining the polarization-optical contrast between the thermally altered and the unaltered areas and/or utilizing for this purpose the interference of the light rays which form from the laser lightwaves in a Gaussian intensity distribution owing to the different phase velocities of the light in the center of thermally altered areas on the one hand and their thermally unaltered surroundings on the other, b) using a recording layer which is an optically monoaxial medium whose refractive indices $n_1$ (perpendicular to the recording layer plane), $n_2$ (in the recording layer plane, perpendicular to the optical main axis), $n_3$ (in the recording layer plane, parallel to the optical main axis) and $n_{iso}$ (refractive index of the thermally altered areas)

with $n_{iso} = \frac{1}{3}(n_1 + n_2 + n_3)$ for light of the wavelength $\lambda = 780$ nm are subject to the relations $$n_1 = n_2 < n_3 \text{ or}$$

$$n_1 = n_2 > n_3$$

and $$|\Delta n| = |n_3 - n_2| > 0.05 \text{ or}$$

$$|\Delta n| = |n_{iso} - n_2| > 0.05 \text{ or alternatively}$$

$$|\Delta n| = |n_{iso} - n_3| > 0.05$$

and which has a thickness d of $$0.05 \, \lambda'/|\Delta n| \text{ to } 0.6 \, \lambda'/|\Delta n|$$

where $\lambda'$ is the wavelength of the read laser light, c) guiding the read laser beam over the recording material in a relative motion in the direction of the optical main axis of the recording layer or perpendicular thereto to in such a way that the plane of polarization $\vec{E}$ of the read laser beam, upon incidence on the recording layer, forms an angle $\theta$ of $0° \pm 10°$, $45° \pm 10°$ or $90° \pm 10°$ with the optical main axis of the recording layer, and d) in the event that the transmitted light is analyzed using a laser beam of light of wavelength $\lambda'$ from $$1.66 \, d \, |\Delta n| \text{ to } 5 \, d \, |\Delta n|$$

and in the event that the reflected light is analyzed using a laser beam of wavelength $\lambda'$ from $$3.33 \, d \, |\Delta n| \text{ to } 20 \, d \, |\Delta n|.$$

In a preferred embodiment of the process according to the invention, a recording layer containing oriented, dichroic, coloring components is used and the write laser beam is directed in such a way that the plane of polarization $\vec{E}$ of the said beam, upon incidence on the recording layer, forms an angle $\theta'$ from $-45°$ to $+45°$ with the transition dipole moment $\vec{\mu}$ of the oriented dichroic components.

We have also found a laser-optical write and read instrument for implementing out the process according to the invention, containing essentially a disk drive and a laser-optical write and read head comprising a laser light source or a plurality of laser light sources for laser light of different wavelengths and, in the beam path of the laser light, a dielectric beam splitter for combining laser beams of different wavelengths, a polarizaing beam splitter or a substantially nonpolarizing beam splitter and also, if appropriate, a λ/4 plate. In the laser-optical write and read instrument, a) the laser-optical write and read head is mounted to be rotatable by an angle from 0° to 90° about the optical axis defined by the direction of propagation of the laser light, and there are provided means for locking said head at 0°, 45° and 90°, and/or b) there is present in the beam path between the polarizing beam splitter or the substantially nonpolarizing beam splitter and the recording layer, in addition to the λ/4 plate, or in place thereof, a λ/2 plate, where c) the λ/4 plate and/or the λ/2 plate is mounted so as to be rotatable about the optical axis by an angle from 0° to ±45° C. relative to the polarization plane $\bar{E}$ of the emitted plane polarized laser light and there are provided means for blocking said plate(s) at 0°, ±22.5° and ±45°.

We have further found a multilayer laser-optical data disk for implementing the novel process using the novel laser-optical write and read instrument, the recording layer of the data disk 1. containing liquid-crystalline compounds in homogeneous planar and tangential orientation or in homogeneous planar and radial orientation, 2. being an optically monoaxial medium whose refractive indices $n_1$, $n_2$, $n_3$ and $n_{iso}$ of light of wavelength λ=780 nm are subject to the relations $$n_1 = n_2 < n_3 \text{ or}$$

$$n_1 = n_2 > n_3$$

and $$|\Delta n| = |n_3 - n_2| > 0.05 \text{ or}$$

$$|\Delta n| = |n_{iso} - n_2| > 0.05 \text{ or alternatively}$$

$$|\Delta n| = |n_{iso} - n_3| > 0.05$$

and 3. having a thickness d from $$0.05 \, \lambda'/|\Delta n| \text{ to } 0.6 \, \lambda'/|\Delta n|.$$

The process according to the invention is practiced with multilayer sheetlike recording materials as defined in the preamble of claim 1.

In this definition, "sheetlike" encompasses all spatial forms whose thickness is substantially less than their length and width. Suitable are, accordingly, tapelike, platelike or disklike recording materials, of which those in disk form are preferred.

The term "multilayer" indicates that the recording material, in addition to the recording layer, contains further layers which are likewise of importance for the function of the material.

Layers of this kind are dimensionally stable base layers, transparent or nontransparent electrode layers and orienting layers which cause a homogeneous planar orientation of liquid-crystalline compounds. In addition the recording material can contain reflector layers, reflector-absorbent layers and protective layers.

Examples of suitable dimensionally stable base layers are foils, plates or disks of nonconductive, transparent and optically clear materials such as polyethylene terephthalate, polycarbonate, polymethyl methacrylate or glass or of metal, preference being given to disks of polycarbonate, polymethyl methacrylate or glass.

Examples of suitable orienting layers are silicon oxide layers vapor deposited at an angle, or polyimide layers microgrooved by rubbing.

Examples of suitable reflector layers are the customary thin metal layers.

Examples of suitable reflector-absorbent layers are the known thin layers of semiconductor materials such as CdSe or CdTe. They show an absorption from 10 to 85% for light of the wavelength $\lambda_1'$ and a reflectivity from 10 to 80% for light of the wavelength $\lambda_2'$.

The essential constituent of the recording material is the recording layer. This recording layer is directly adjacent to an orienting layer or is enclosed by two orienting layers, the first option being preferred. The recording layer contains liquid-crystalline compounds in homogeneous planar orientation.

Suitable for this purpose are all liquid-crystalline compounds which form one or more liquid-crystalline phases at from −20° to 300° C.

Highly suitable are colorless, nondichroically colored or dichroically colored, low molecular weight, liquid-crystalline compounds, for example from the class of the oligophenylenes, of the aromatic azomethines or of the merocyanines, whose liquid-crystalline state can be frozen in a suitable polymer matrix.

Highly suitable liquid-crystalline compounds are predominantly linear, liquid-crystalline polymers having mesogenic groups in the polymer main chain, for example from the class of the polyesters, polyester amides, polyester ethers, polyester carbonates, polyester amide imides or polyester imides.

However, polymers having lateral mesogenic groups are particularly highly suitable.

Examples of particularly highly suitable polymers having lateral mesogenic groups are those whose chains are made up of units of the formula $$\left[ \begin{array}{c} R^1 \\ | \\ -CH-C- \\ | \\ C \\ \diagup \diagdown \\ O \quad O \\ \diagdown \\ R-R^2 \end{array} \right] \quad (I)$$

or which contain in the chain units of the formula (I).

In the formula, $R^1$ is hydrogen, methyl or chlorine, R is a spacer group, and $R^2$ is a mesogenic group.

Examples of suitable radicals R (spacers) are $$-(CH_2)_2-, \; -(CH_2)_3-, \; -(CH_2)_4-, \; -(CH_2)_5-,$$

$$-(CH_2)_6-, \; -(CH_2)_7-, \; -(CH_2)_8-, \; -(CH_2)_9-,$$

$$-(CH_2)_{10}-, \; -(CH_2)_{11}-, \; -(CH_2)_2-O-(CH_2)_2-,$$

$$-(CH_2)_3-O-(CH_2)_2-, \; -(CH_2)_2-\underset{\underset{CH_3}{|}}{N}-(CH_2)_2-,$$

-continued $-CH-CH_2-$ or $-CH-CH_2-CH_2-$.
    $|$                $|$
    $CH_3$            $CH_3$ Examples of suitable radicals $R^2$ are

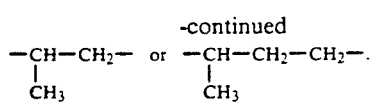

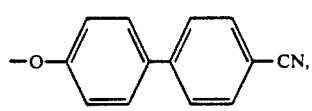

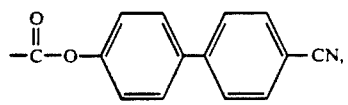

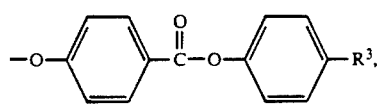

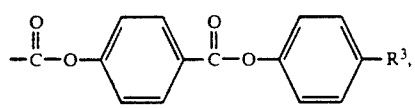

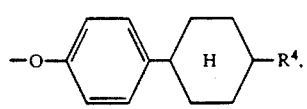

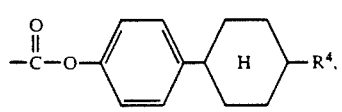

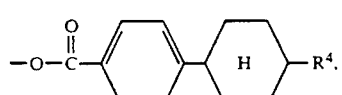

-continued

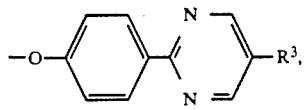

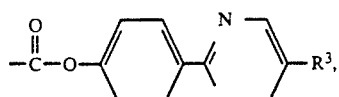

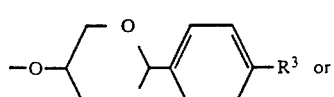

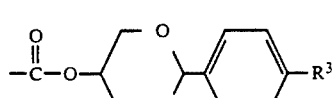

in which $R^3$ is $C_1$-$C_{12}$-alkyl, $C_1$-$C_{12}$-alkoxy, $C_1$-$C_{12}$-alkoxycarbonyl, $C_1$-$C_{12}$-alkanoyloxy, fluorine, chlorine, cyano, 4-cyanophenyl or nitro and $R^4$ is a $C_1$-$C_{12}$-alkyl.

Further examples of particularly highly suitable polymers having lateral mesogenic groups are those whose chains are made of units of the formulae (I) and (II)

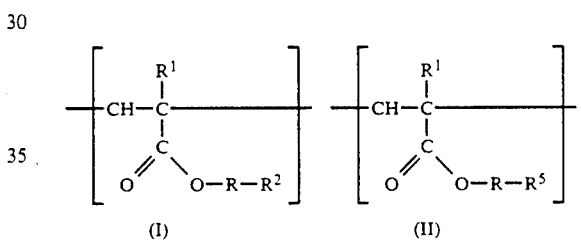

or which contain in the polymer chain units of the formulae (I) and (II) in which R, $R^1$ and $R^2$ have the above-mentioned meanings and $R^5$ is a dye which is bonded to R via —O—, —S— or —N—.

Examples of dye radicals $R^5$ are:

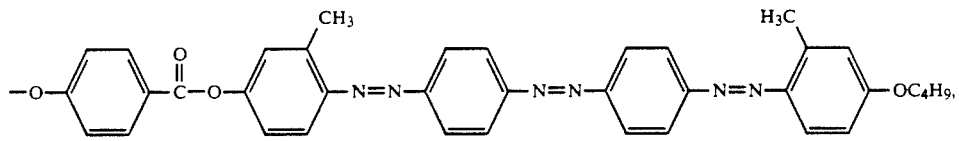

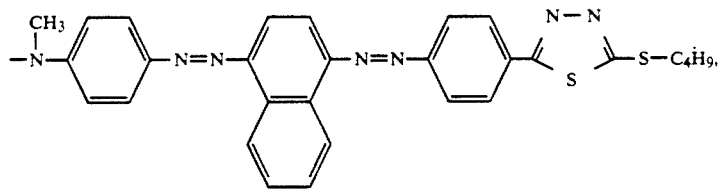

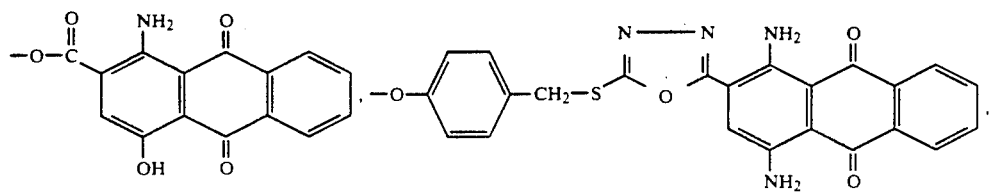

-continued

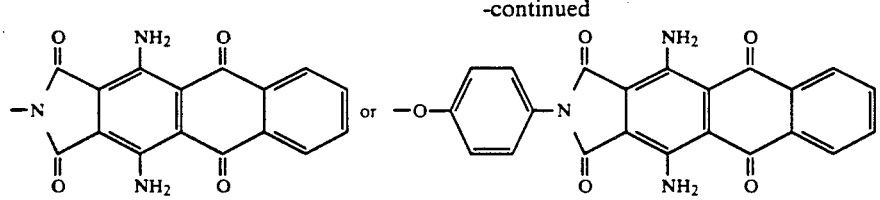

Further examples of particularly highly suitable polymers having lateral mesogenic groups are those whose polymer chain contains units of the formula

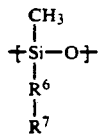   (VI)

where $R^6$ is $\text{--}[CH_2]_n\text{--}$ and $n = 4\text{--}24$ and $R^7$ is a radical of the formulae

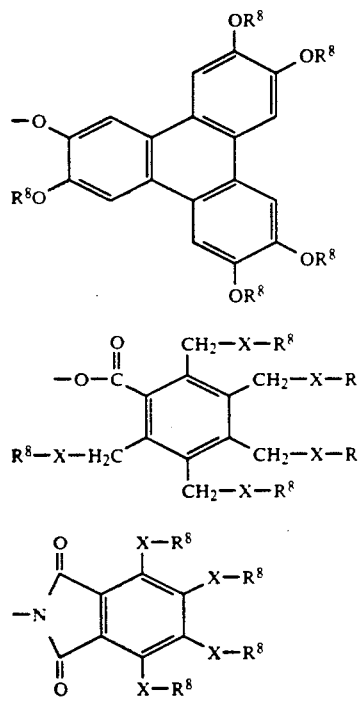

where X is —O—, —S—,

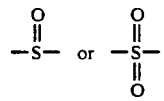

and $R^8$ is a $C_1\text{--}C_{12}$-alkyl and where the polymer can contain identical or different $R^7$s.

Further examples of particularly highly suitable polymers are those whose polymer chain contains units of the formula

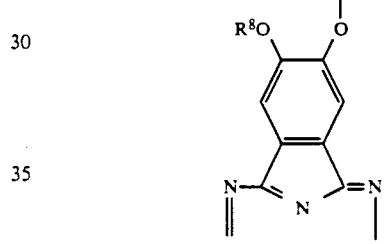
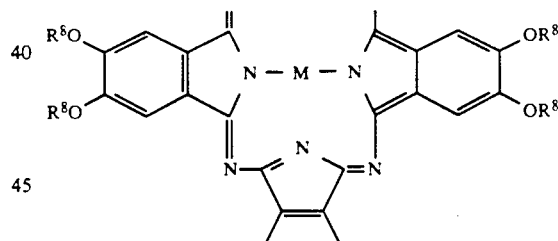

where $R^6$ and $R^8$ have the abovementioned meanings and M is two hydrogen atoms or a metal ion.

The recording layer can contain nondichroic and/or dichroic dyes, preference being given to those of the dichroic type.

Examples of suitable dichroic dyes are azo dyes such as

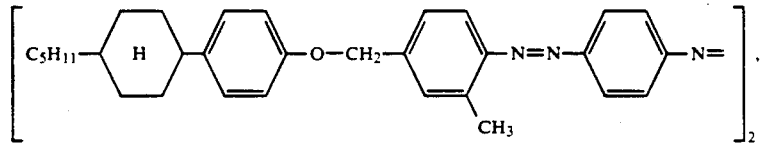

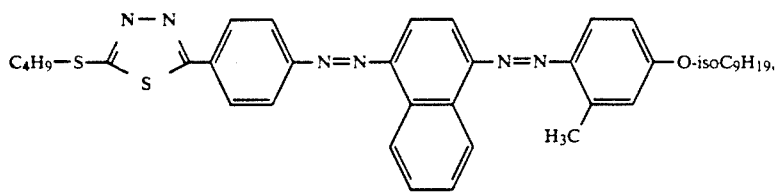
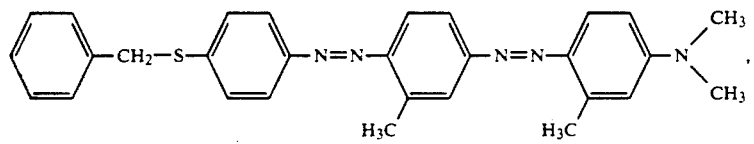
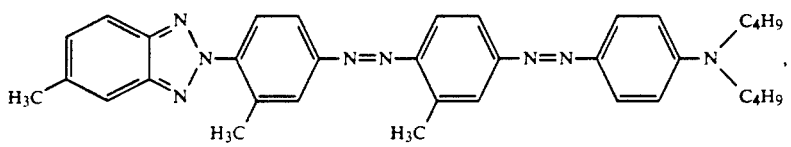
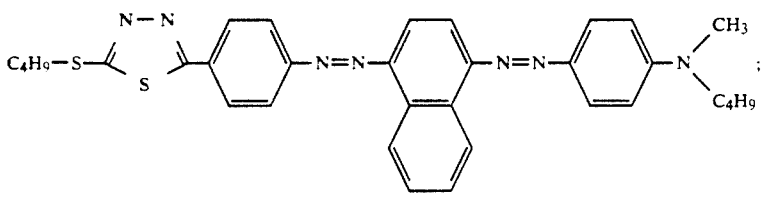
perylene derivatives such as
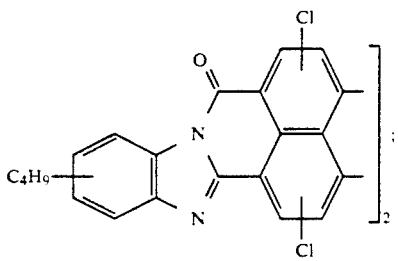
anthraquinone dyes such as
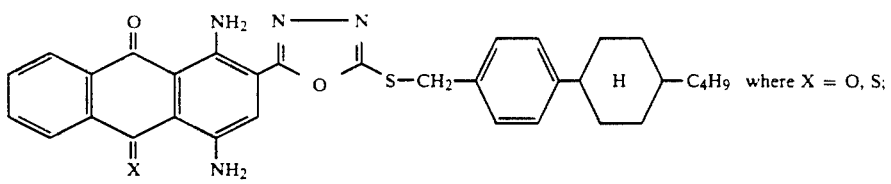 where X = O, S;
azulene dyes such as
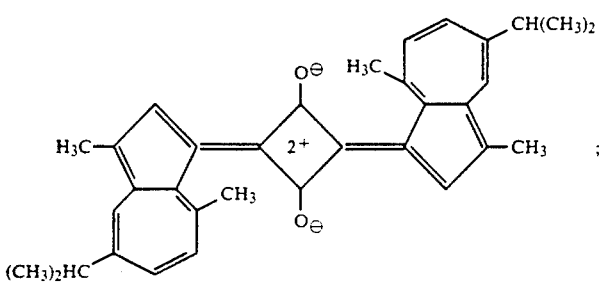
phthalocyanines such as -continued

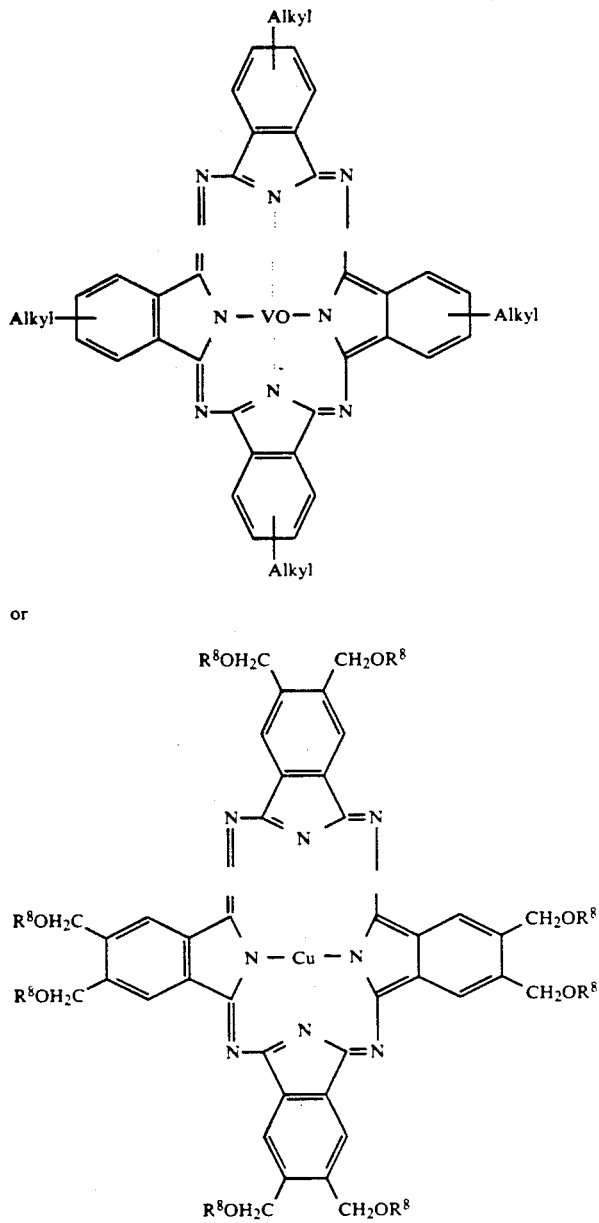

or where $R^8 = n\text{-}C_{12}H_{25}$;

or metal complexes such as

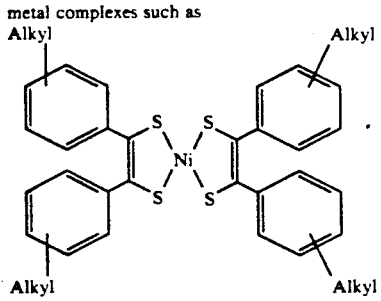

In addition, the recording layer can contain suitable additives such as UV stabilizers, antioxidants or plasticizers in monomolecular dispersion.

To be suitable for use in the process according to the invention, the recording layer as a whole must be an optically positive or negative monoaxial medium whose refractive indices $n_1$ (perpendicular to the recording layer plane), $n_2$ (in the recording layer plane, perpendicular to the optical main axis), $n_3$ (in the recording layer plane, parallel to the optical main axis) and $n_{iso}$ (refractive index of the thermally altered areas) with $n_{iso} = \frac{1}{3}(n_1 + n_2 + n_3)$ for light of the wavelength $\lambda = 780$ nm are subject to the relations $n_1 = n_2 < n_3$ (optically positively monoaxial medium) or $n_1 = n_2 > n_3$ (optically negatively monoaxial medium).

At the same time the absolute values of the differences between the individual refractive indices of the layer must meet the relationships $|\Delta n| = |n_3 - n_2| > 0.05$, preferably $> 0.10$, in particular $> 0.15$, or $|\Delta n| = |n_{iso} - n_2| > 0.05$, preferably $> 0.10$, in particular $> 0.15$ or alternatively $|\Delta n| = |n_{iso} - n_3| > 0.05$, preferably $> 0.10$, in particular $> 0.15$.

In addition, the recording layer must have a thickness d from $0.05 \lambda'/|\Delta n|$ to $0.6 \lambda'/|\Delta n|$, preferably from $0.1 \lambda'/|\Delta n|$ to $0.35 \lambda'/|\Delta n|$ and in particular $0.15 \lambda'/|\Delta n|$ to $0.3 \lambda'/|\Delta n|$ where $\lambda'$ is the wavelength of the read laser beam.

The material composition of the recording layer is therefore substantially freely choosable as long as the layer as a whole satisfies the preceding conditions. Whether a layer of a certain composition is suitable for the process according to the invention can be determined by means of simple preliminary tests or can be estimated on the basis of the known relevant physical properties of the compounds which come into consideration.

Suitable recording layers are produced in the usual manner adopted for producing thin layers, for example by spin coating solutions containing the components of the layers onto suitable base materials, by dipping the base materials into such solutions (dip coating), by knife coating or by spraying these solutions onto the bases.

The production of the silicon oxide orienting layers present on the base materials is effected in a conventional manner by vapor deposition at a suitable angle. Orienting layers made of polyimide are obtained in a conventional manner by applying the polyimide precursor in solution, drying the applied wet layer, and subjecting the dry layer to thermal crosslinking and rubbing.

The base materials are produced by the usual plastics, glass or metal processing techniques.

The conventionally produced recording materials suitable for the process according to the invention are written with analogue or digital data by means of a write laser beam which in the former case would be of the intensity-modulated continuous wave type and in the latter case of the pulse-coded type.

In general, suitable lasers have a beam power output from 5 to 30 mW at the write wavelength $\lambda$. The focus diameter of the write laser beam ranges in general from 1 to 3 $\mu$m. Advantageously, the write laser beam will comprise light of the wavelength $\lambda_1$ which is readily absorbed by the recording layer in question. Wavelengths $\lambda_1$ from 400 to 1,000 nm, in particular from 630 to 860 nm, are advantageous.

In writing, the write laser beam is guided in a relative motion over the recording material while being perpendicularly incident thereon and/or focused on the recording layer. At the point of incidence the recording layer is locally heated, producing thermally altered areas. In these areas, the recording layer is no longer in homogeneous planar orientation but is optically isotropic. On writing data using pulse-coded lasers, these areas have the shape of round or substantially round spots, while if a continuous wave laser is used they can have any desired shape.

In the process according to the invention, recording layers which contain oriented dichroic coloring components are written with a write laser beam of the wavelength $\lambda_1$ in such a way that the plane of the polarization $\vec{E}$ of the beam, upon incidence on the recording layer, forms an angle $\theta'$ from $-45°$ to $+45°$ with the transition dipole moment $\vec{\mu}$ the oriented dichroic components, this angle preferably ranging from $-20°$ to $+20°$ C., in particular from $-10°$ to $+10°$.

The written data are read with the aid of a read laser beam. The beam power of the laser at the read wavelength $\lambda'$ is below the power threshold at which writing becomes possible. In general, the beam power for reading ranges from 0.1 to 2 mW. It is advantageous to use laser light of the wavelength $\lambda_1'$ which is readily absorbed by the recording layer, or of the wavelength $\lambda_2'$ which is absorbed only poorly, if at all. Advantageous wavelengths $\lambda_1'$ and $\lambda_2'$ range from 400 to 1,000 nm, in particular from 630 to 860 nm.

In reading, too, the read laser beam is guided in a relative motion over the recording material while being perpendicularly incident thereon and/or focused on the recording layer.

In the process according to the invention, the read laser beam is guided over the recording material along the optical main axis of the recording layer or perpendicularly thereto and is directed in such a way that the plane of its polarization $\vec{E}$, upon incidence on the recording layer, forms an angle $\theta$ of $0°\pm10°$, $45°\pm10°$ or $90°\pm10°$ with the optical main axis of the recording material.

If the read laser beam, in scanning over the recording layer, is incident upon a thermally altered area, the properties of the light transmitted or reflected by the recording material are altered, which is detectable by means of suitable detectors.

In the process according to the invention, this change in properties is exploited to read the data by way of the polarization-optical contrast between the thermally altered and the unaltered areas.

In a further procedure according to the invention, the data are read via the interference of those light waves which form from the laser light waves in a Gaussian intensity distribution resulting from the different phase velocity of the light in the center of thermally altered areas on the one hand and their thermally unaltered surroundings on the other. A recording material which can be read in this way is generally referred to as a phase shift storage medium.

Of particular advantage in this connection is the method of reading the data via the birefringence contrast. To this end, a read laser beam of light of the wavelength $\lambda_2'$ is directed at the recording material in such a way that the plane of the polarization $\vec{E}$ of the beam, upon incidence on the recording layer, forms an angle $\theta$ of $45°\pm10°$ with the optical main axis of the recording layer. If here the light transmitted by the recording material is analyzed, laser light of a wavelength $\lambda_2'$ from $1.66 d |\Delta n|$ to $5 d |\Delta n|$, where d is equal to the thickness of the recording layer and $\Delta n$ is equal to $n_3 - n_2$, is used. If, on the other hand, the light reflected by a reflector layer mounted behind the recording layer is analyzed, laser light of a wavelength $\lambda_2'$ from 3.33 d $|\Delta n|$ to 20 d $|\Delta n|$ is used.

If the wavelength $\lambda_2'$ is predetermined from the outset because of technical boundary conditions, then the thickness d of the recording layer must be chosen in such a way that the conditions mentioned are satisfied.

If the recording layer contains dichroically coloring components in homogeneous planar orientation, it is of particular advantage according to the invention to read the data by utilizing the constrast in dichroism. To this end, a read laser beam of light of the wavelength $\lambda_1'$ is directed at the recording material in such a way that the plane of polarization $\vec{E}$ of the beam, upon incidence on the recording layer, forms an angle $\theta$ of $0°\pm10°$ or $90°\pm10°$ in particular $90°\pm10°$, with the transition dipole moment $\vec{\mu}$ of the oriented dichroic components.

To read off the data according to the invention by utilizing the interference of light waves, i.e. by using the recording material as a phase shift storage medium, use is made of a read laser beam of light of the wavelength $\lambda_2'$ and a recording layer of thickness d from 0.05 $\lambda_2'/|\Delta n|$ to 0.6 $\lambda_2'/|\Delta n|$, preferably 0.1 $\lambda_2'/|\Delta n|$ to 0.35 $\lambda_2'/|\Delta n|$, in particular 0.15 $\lambda_2'/|\Delta n|$ to 0.3 $\lambda_2'/|\Delta n|$, where $|\Delta n|$ is equal to $|n_{iso}-n_2|$ or equal to $|n_{iso}-n_3|$. If the layer thickness d is predetermined from the start, then the wavelength $\lambda_2'$ must be chosen in such a way that, if the transmitted light is analyzed, said wavelength meets the condition $$\lambda_2' = 1.66 \, d \cdot |\Delta n| \text{ nm to } 5 \, d \, |\Delta n| \text{ nm}$$

and if the reflected light is analyzed the condition $$\lambda_2' = 3.33 \, d \cdot |\Delta n| \text{ nm to } 20 \, d \, |\Delta n| \text{ nm}.$$

It is of advantage, however, to adapt the layer thickness d to the wavelength $\lambda_2'$. In this variant, the read laser beam is directed at the recording material in such a way that the plane of polarization $\vec{E}$ of the beam, upon incidence on the recording layer, forms an angle $\theta$ of $0°\pm10°$ or $90°\pm10°$ with the optical main axis of the recording material.

If the recording layer here additionally contains dichroic coloring components in homogeneous planar orientation, the data can be read simultaneously via the interference of light waves and via the dichroism contrast. To this end, two read laser beams of light of the wavelengths $\lambda_1'$ and $\lambda_2'$ are used and focused on the same spot. Of these beams, the laser beam of the wavelength $\lambda_1'$ is directed at the recording material in such a way that the plane of polarization $\vec{E}$ of the beam, upon incidence on the recording layer, forms an angle $\theta$ from $0°\pm10°$ to $90°\pm10°$ with the transition dipole moment $\mu$ of the dichroic component, and the read laser beam of the wave-length $\lambda_2'$ is directed at the recording material in such a way that the plane of polarization $\vec{E}$ of the beam, upon incidence upon the recording layer, forms an angle $\theta$ of $0°\pm10°$ or $90°\pm10°$ with the optical main axis of the layer. If the thickness d of the recording layer is predetermined from the outset, the wavelengths $\lambda_1'$ and $\lambda_2'$ need to be adapted to the layer thickness in accordance with the abovementioned conditions. However, it is of particular advantage to select two wavelengths $\lambda_1'$ and $\lambda_2'$ which are close to each other and to adapt the layer thickness thereto in accordance with the stated conditions.

For the process according to the invention, it is of very particular advantage to use write and read lasers which emit laser radiation within the wavelength range from 630 to 860 nm. In this connection it is also of very particular advantage for the write wavelength $\lambda_1$ to be identical with the read wavelength $\lambda_1'$ or for the read wavelength $\lambda_2'$ to differ therefrom by not more than $\Delta\lambda'=200$ nm, preferably 180 nm and in particular 150 nm. The customary semiconductor and gas lasers emit in this range. Accordingly, the thickness d of the recording layers which are particularly advantageous for the process according to the invention are below 5 $\mu$m, preferably below 2.5 $\mu$m, in particular below 1.5 $\mu$m.

The process according to the invention has numerous advantages over the prior art. For instance, it is simply adaptable at any time to given technical boundary conditions without loss of any of the other advantages. In addition, misinformation an be discovered in a simple manner by reading one and the same recording material by different methods according to the invention and looking for discrepancies. The process according to the invention leads to a very much higher sensitivity in writing and to an extremely high optical contrast in reading. It is therefore possible to write and read multilayer, sheetlike, laser-optical recording materials containing recording layers based on liquid-crystalline compounds in homogeneous planar orientation more rapidly and with a lower error rate then by prior art processes.

The process according to the invention can be carried out with the aid of existing laser-optical instruments. However, it is of particular advantage to use for this purpose the laser-optical write and read instrument according to the invention. It is of very particular advantage to carry out the process according to the invention with the aid of the laser-optical write and read instrument of the invention using the multilayer, laser-optical data disks according to the invention.

The laser-optical write and read instrument according to the invention conforms in construction and function to those of the prior art. However, it differs from the latter by the following features: its laser-optical write and read head is mounted to be rotatable about the optical axis defined by the direction of propagation of the laser beam by an angle from 0° to 90°, means for locking the head at 0°, 45° and 90° being provided. In this arrangement, the head is mounted in a conventional manner, for example by means of a rotatable abutment. Suitable devices for locking the head at a certain angle are likewise known in their constructional features.

With this write and read head it is also possible, if reading is only to be done via the birefringence contrast, to omit the $\lambda/4$ plate in the path of the laser beam.

An additional or alternative distinguishing feature is that in the beam path between the polarization beam splitter and the recording layer there is a $\lambda/2$ plate, as well as the $\lambda/4$ plate. In this arrangement, the $\lambda/4$ plate and/or the $\lambda/2$ plate are or is mounted to be rotatable by an angle from 0° to $\pm45°$ relative to the plane of polarization $\vec{E}$ of the emitted, plane polarized laser light, there being provided customary devices for locking them at 0°, $\pm22.5°$ and $\pm45°$.

The laser-optical write and read instrument can accordingly contain a write and read head which has either both the distinguishing features or only one of the two.

The optical write and read laser according to the invention has numerous advantages over the prior art. For instance, the angle between the plane of polarization $\vec{E}$ of the laser beams emitted by the laser-optical head and the data track is no longer unalterably fixed, but can be adapted as desired to the write and/or read process. As a result, the process according to the invention can be carried out particularly efficiently and advantageously, all possible variants according to the invention also being achievable with the aid of one and the same instrument. In addition, there is even an option to carry out the two process variants simultaneously.

The multilayer laser-optical data disk according to the invention contains essentially a dimensionally stable base material, an orienting layer and the recording layer. In addition it can contain further suitable layers such as reflector layers, electrode layers, reflector-absorber layers and protective layers.

Particularly advantageous data disks consist of a base material, an orienting layer, the recording layer and a reflector or reflector-absorber layer, the layers being superposed on one another in the stated order.

Examples of suitable dimensionally stable base materials and orienting layers are those mentioned above.

The material composition of the recording layer is the same as that of the recording layer described above, recording layers based on liquid-crystalline polymers having lateral mesogenic groups being advantageous and those based on liquid-crystalline polymers having lateral mesogenic groups and dichroic coloring components in homogeneous planar orientation being particularly advantageous.

The recording layer of the data disk according to the invention contains the liquid-crystalline compounds and, if present, the dichroically coloring components in homogeneous planar and radial or in homogeneous planar and tangential orientation. It is an optically positive or negative monoaxial medium whose refractive indices $n_1$, $n_2$, $n_3$ and $n_{iso}$ for light of the wavelength $\lambda = 780$ nm are subject to the conditions $n_1 = n_2 < n_3$ (optically positive monoaxial medium) or $n_1 = n_2 > n_3$ (optically negative monoaxial medium).

At the same time the absolute values of the differences between the individual refractive indices of the layer must meet the relationships $|\Delta n| = |n_3 - n_2| > 0.05$, preferably $>0.1$, particularly $>0.15$ or $|\Delta n| = |n_{iso} - n_2| > 0.05$, preferably, $>0.1$, particularly $>0.15$ or alternatively $|\Delta n| = |n_{iso} - n_3| > 0.05$ preferably $>0.1$, particularly $>0.15$.

In addition the recording layer must have a thickness d from $0.05\ \lambda'/|\Delta n|$ to $0.6\ \lambda'/|\Delta n|$, preferably from $0.1\ \lambda'/|\Delta n|$ to $0.35\ \lambda'/|\Delta n|$ and in particular from $0.15\ \lambda'/|\Delta n|$ to $0.3\ \lambda'/|\Delta n|$, where $\lambda'$ is the wavelength of the read laser beam.

The material composition of the recording layer is therefore here too substantially freely choosable as long as the layer as a whole satisfies the abovementioned conditions. Whether a layer of a certain composition is suitable for the laser-optical data disk according to the invention can be determined by means of simple preliminary tests or be estimated on the basis of the known relevant physical properties of the compounds which come into consideration.

Examples of suitable reflector or reflector-absorber layers are those mentioned above.

The production of this multilayer laser-optical data disk is achieved in a conventional manner as described above.

The data disk can be written and read in a conventional manner with the aid of existing instruments.

According to the invention, however, it is of very particular advantage that this data disk be written and read in the laser-optical write and read instrument of the invention using the process according to the invention, the write and read laser beams being guided in a relative motion over the data disk along a circular or spiral path.

The multilayer laser-optical data disk according to the invention has numerous advantages. For instance, it can written and read substantially errorlessly particularly rapidly using low laser power. In the written state it has a particularly high optical contrast and is markedly stable, so that there is no loss of information even on prolonged storage. In addition, it is simple to manufacture. Another factor is that it is highly suitable for performing the process according to the invention using the laser-optical write and read instrument according to the invention. Furthermore, the data disk is erasable and rewritable.

By providing a laser-optical write and read process adapted to a laser-optical instrument for carrying out the said process and also a laser-optical data disk, the present invention provides an integrated system for laser-optical data processing which has particular technical advantages over the prior art. For instance, aside from the higher write and read speed, the higher sensitivity, the lower error rate and the adaptability to given technical boundary conditions, it is particularly noteworthy that it is possible to identify misinformation in a simple manner.

The integrated laser-optical data processing system according to the invention is therefore suitable for numerous applications, for example for the digital or analogue recording of audiovisual data, as storage memories for computers or for archiving data records.

The invention is further described in the attached drawings, FIGS. 1 and 2, which are described below.

DETAILED DESCRIPTION OF THE DRAWINGS

Figure 1:
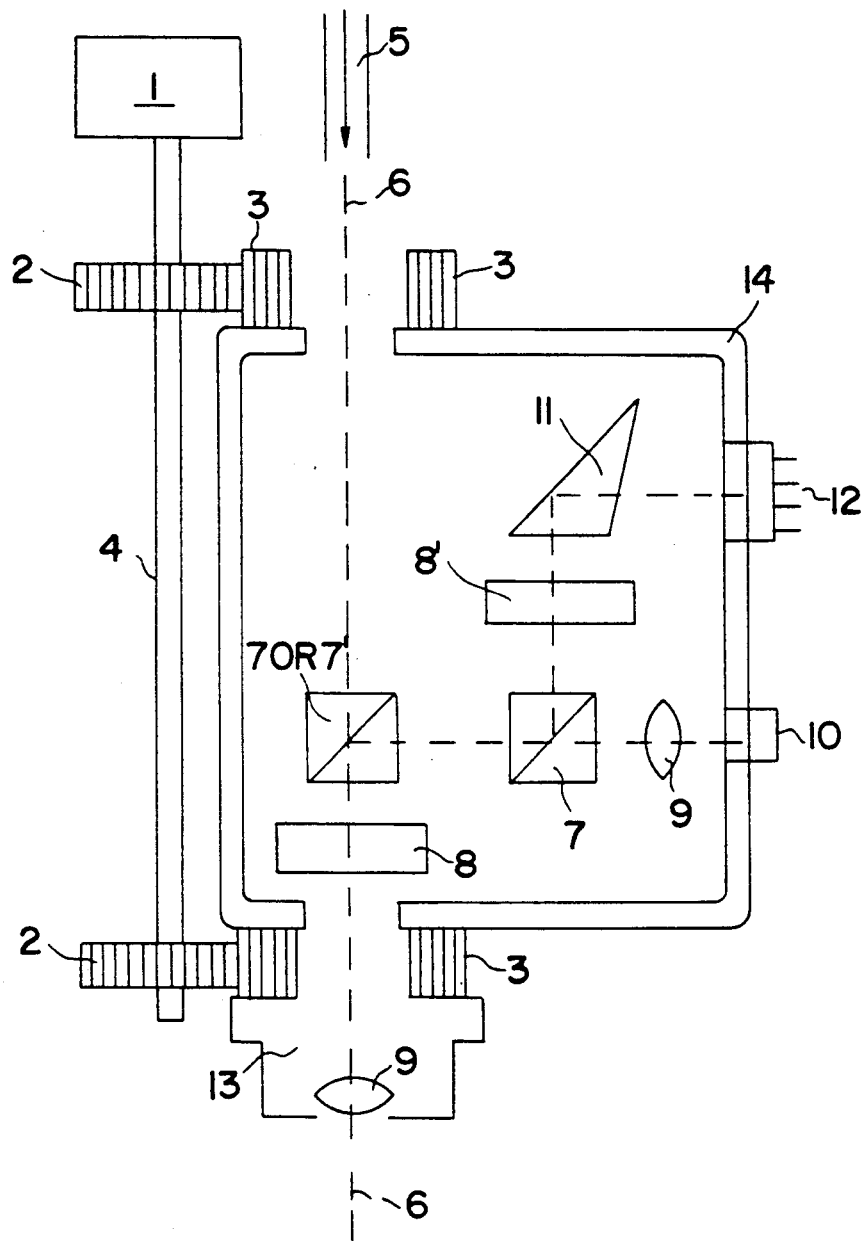
FIG. 1 depicts a laser-optical writer and read head which is rotatable as a whole.

In FIG. 1 the laser-optical writer and read head is rotatable as a whole. The cog wheel drive (1) turns the axle (4) which in turn rotates the cog wheels (2). The teeth of the cog wheels (2) interlock with the teeth of the cog wheel ring (3) which is securely fastened to the housing (14) of the laser-optical write and read head. In this manner an angle can be formed between the plane of polarization of the collimated linearly polarized laser beam (5) and the optical axis (6). The laser beam (5) enters the write and read head and is split by either a polarized (7) or non-polarized (7') beam splitter. The optical axis then, optionally passes through a $\lambda/2$ or $\lambda/4$ plate (8) and lens (9) in the actuator system (13). In the write and read head the beam is split by another beam splitter(7) passing either through a lens (9) to single detector (10) or through a $\lambda/2$ plate (8') and critical-angle prism (11) to a four-quadrant detector (12).

Figure 2:
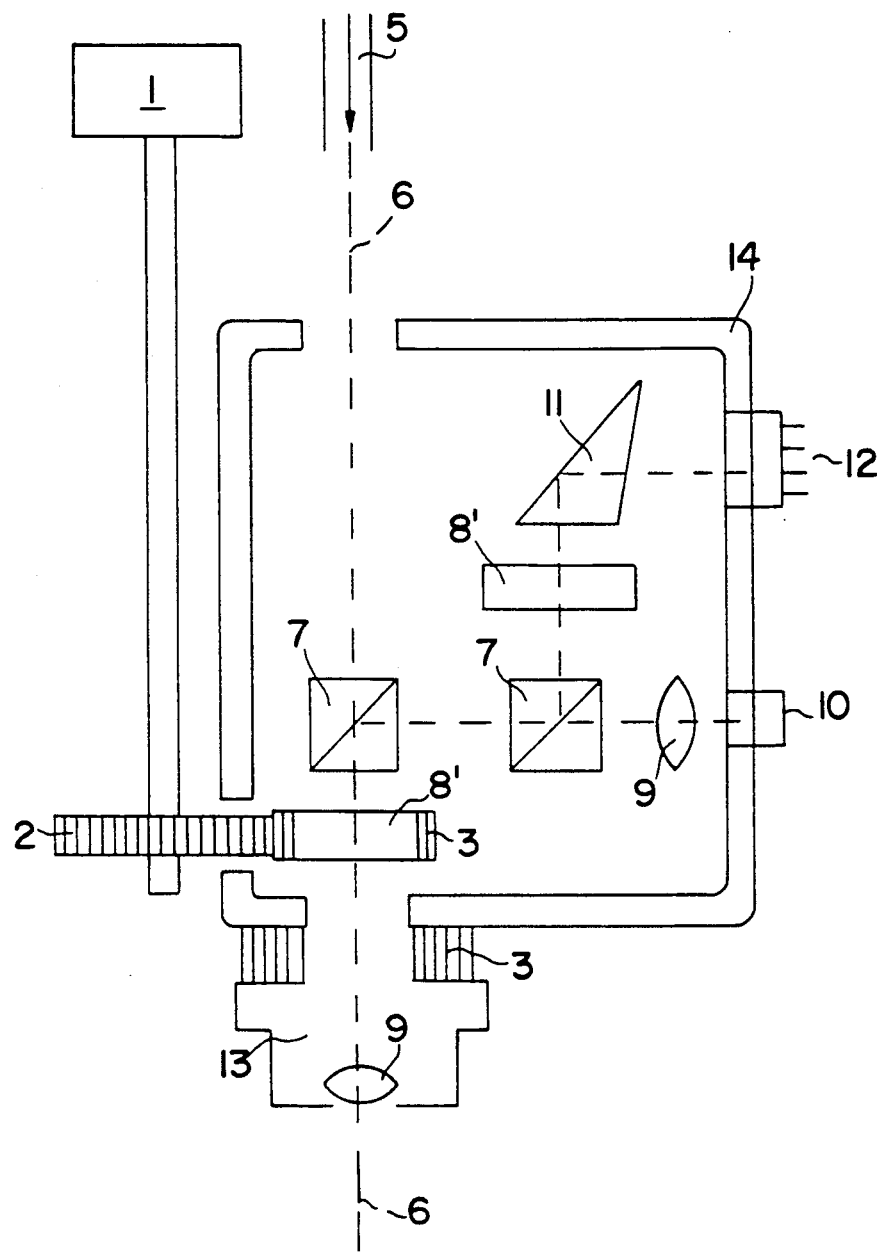
FIG. 2 depicts a laser-optical writer and read head having rotatable $\lambda/2$ and/or $\lambda/4$ plates.

In FIG. 2 the laser beam (5), optical axis (6), beam splitters(7), lenses (9), detectors (10) and (12), critical-angle prisms (11), λ/2 plate (8'), actuator (13) and housing (14) of the write and read head are significantly the same as in FIG. 1. The distinction in the drawings is that the cog wheel drive (1) turns one cog wheel (2) the teeth of which interlock with a cog wheel ring (3) on an obligatory λ/2 plate (8'). Thus, the angle between the plane of polarization and the optical axis is formed by rotating the λ/2 plate instead of the entire write and read head.

The above-described drawings are not intended to limit the scope of the claimed invention.

The following examples, which are also not intended to limit the scope of the claimed invention, further describe the invention.

EXAMPLE 1

To carry out the Examples and the Comparisons, first we prepared a polymer which had lateral mesogenic groups and whose polymer chain comprised 80% by weight of units conforming to the general formula (I) and 20% by weight of units conforming to the general formula (II).

80% by weight of

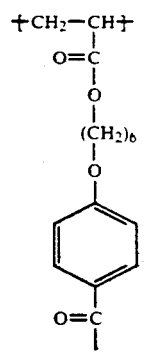

(I)

20% by weight of

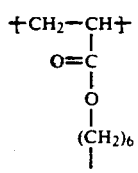

(II)

-continued

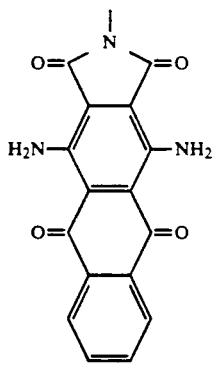

This polymer (I, II) was used by way of example for producing the thermally alterable recording layer of multilayer sheetlike recording materials and of laser-optical data disks according to the invention, the said recording layer containing liquid-crystalline compounds in homogeneous planar orientation.

Method of preparation 100 g of a correspondingly proportioned mixture of 80% by weight of acrylate monomer (I) and 20% by weight of acrylate monomer (II) were dissolved in 1000 ml of absolute tetrahydrofuran, and 0.5 g of azoisobutyronitrile (AIBN) was added. The solution was then degassed by passing nitrogen therethrough for 30 minutes and polymerized at 70° C. for 48 hours. The resulting polymer (I, II) was precipitated with cold diethyl ether, filtered off, dissolved in methylene chloride and again precipitated. This procedure was repeated until the monomers were no longer detectable in a thin layer chromatogram. The polymer (I, II) thus purified was dried at from 30° to 40° C. in an oil pump vacuum. The yield was 30%, based on the amount of monomer.

The quantitative composition of the polymer (I, II) was determined by way of UV spectroscopy and elemental analysis and was found to conform to the desired composition.

Properties of polymers (I, II) relevant for application

The absorption maximum of polymer (I, II) was measured spectrophometrically on an 860 nm thick layer exhibiting homogeneous planar orientation.

The optical behavior of liquid-crystalline polymer (I, II) was determined using an Ortholux II Pol-BK polarizing microscope from Leitz. The sample was fixed between a microscope slide and a cover slip and temperature-conditioned by means of an FP 52 hot bank from Mettler.

Differential scanning calorimetry on the polymer was carried out using a DSC 2c instrument from Perkin Elmer. For this DSC measurement, the substance (1–3 mg) was weighed into small aluminum dishes and sealed with a lid. Prior to the actual measurement, the sample was heated up to beyond the melting or clearing point. The rate of heating was 10° C. per minute. The measured data were analysed by means of a Micro 821 computer from Dietz. The software used was developed in the study group of Professor Kosfeld (Aachen/Duisburg).

The order parameter S was determined from the known equation $$S = \frac{CR - 1}{CR + 2}$$

The dichroic ratio CR was determined in the usual manner by measuring the absorbance A" (measurement with light polarized parallel to the preferred direction of the liquid-crystalline phase, i.e. the direction of the optical main axis) and A' (measurement with light polarized perpendicular to the preferred direction of the liquid-crystalline phase) and applying the relationship $$CR = \frac{A''}{A'}$$

The phase difference $\Delta l$ was determined using a customary measuring setup comprising a semiconductor laser ($\lambda = 780$ nm), a polarizer, the sample, an $\lambda/4$ plate, a rotating analyzer, a detector and a lock-in amplifier.

The absolute value of the difference of the refractive indices $$|\Delta n| = |n_3 - n_2|$$

was calculated by finding the phase difference $\Delta l$ to be 194 nm at the wavelength $\lambda = 780$ nm in the case of an 860 nm thick layer of polymer (I, II) in homogeneous planar orientation and applying the relationship $$\Delta l = |\Delta n| \cdot d$$

The results of these investigations can be found in Table 1.

TABLE 1

| Application properties of polymer (I, II) | |
|---|---|
| Property | Numerical value |
| Absorption maximum | $\lambda_{max} = 698$ nm |
| Phase transitions | glassy - smectic A, 41° C. |
| | smectic A - nematic, 88° C. |
| | nematic - isotropic, 99° C. |
| A" | 0.13 |
| A' | 0.177 |
| $CR = \frac{A''}{A'}$ | 6.38 |
| $S = \frac{CR - 1}{CR + 2}$ | 0.64 |
| $|\Delta n| = |n_3 - n_2|$ for light of wavelength $\lambda = 780$ nm | 0.22 |

EXAMPLE 2

Production of laser-optical data disks

Two sets of data disks were produced to different specifications employing the following methods.

Method A

General method of production

A cleaned, dust-free glass disk 13 cm in diameter was coated with an orienting layer of polyimide from 50 to 100 nm in thickness by spin coating with a 3% strength solution of a polyimide precursor (for example ®ZLI 2650 from Merck) and subsequent drying and curing of the wet coat at 300° C. The polyimide layer was then rubbed with velour while turning the glass plate to produce tangential orienting microgrooves.

On top of this orienting layer a recording layer was produced by spin coating with a 3-30% strength solution of polymer (I, II) in 1,1,2-trichloroethane or tetrachloroethylene, drying the wet coat and temperature-conditioning the dry layer at 100° C. The temperature-conditioning has the effect of aligning the mesogenic and dichroic side groups of polymer (I, II) in homogeneous planar and tangential orientation. The thickness d of the recording layer was set via the speed of rotation of the glass disk during spin coating and via the concentration of the polymer solution. The recording layer was then covered with a 100 nm thick reflector layer of aluminum by vapor deposition.

Method B

General method of production

This method for producing laser-optical data disks differs from method A only in that here the oriented layer used for obtaining homogeneous planar and tangential orientation was a silicon oxide layer.

Method C

General method of production

This method differs from method B only in that here the silicon oxide layer was used to obtain homogeneous planar and radial orientation of the recording layer.

The laser-optical data disks produced by methods A to C were intended for reading the written data under reflection conditions. The following read laser light wavelengths $\lambda'$ were chosen at the outset:
$\lambda_1' = 633$ nm (light of a wavelength $\lambda'$ which is strongly absorbed by the recording layer) and
$\lambda_2 40 = 781$ nm (light of a wavelength $\lambda'$ which is only poorly absorbed by the recording layer),
so that the layer thickness d of the recording layer had to be adapted to these wavelengths in accordance with the relationship $$d = 0.05 \, \lambda'/|\Delta n| \text{ to } 0.3 \, \lambda'/|\Delta n|.$$

Table 2 gives an overview of the application properties of ready-produced laser-optical data disks.

From the values of Table 2 it is possible to calculate the birefringence of the recording layers as $$|\Delta n| = 0.209 \text{ to } 0.22$$

and the dichroism thereof as $$S = 0.62 \text{ to } 0.65.$$

Data disks to specifications 2.1 and 2.5 to 2.8 were less well adapted to the parameters of the invention, if light of the wavelength $\lambda_1' = 633$ nm was used, than data disks to specifications 2.2 to 2.4, 2.9 and 2.10.

If light of the wavelength $\lambda_2' = 781$ nm was used, data disks to specifications 2.1 and 2.6 to 2.8 were less well adapted to the parameters of the invention than data disks 2.2 to 2.5, 2.9 and 2.10.

TABLE 2

| Laser-optical data disks and their application properties | | | |
|---|---|---|---|
| Data disk to specification No. | Method of production | Thickness d of recording layer (nm) | Phase difference $\Delta l$ at 780 nm (nm) |
| 2.1 | A | 105 | 22 |
| 2.2 | A | 372 | 78 |
| 2.3 | A | 595 | 125 |
| 2.4 | A | 895 | 194 |

TABLE 2-continued

Laser-optical data disks and their application properties

| Data disk to spec- ification No. | Method of production | Thickness d of recording layer (nm) | Phase difference Δl at 780 nm (nm) |
|---|---|---|---|
| 2.5 | A | 1050 | 222 |
| 2.6 | A | 1340 | 285 |
| 2.7 | A | 1820 | 382 |
| 2.8 | A | 2620 | 548 |
| 2.9 | B | 900$^a$ | 191 |
| 2.10 | C | 910$^b$ | 188 |

$^a$homogeneous planar and tangential orientation
$^b$homogeneous planar and radial orientation

EXAMPLE 3

Performing the laser-optical data recording process with the aid of laser-optical data disks from Example 2.

3.1. The laser-optical write and read instruments

The process was carried out using existing laser-optical write and read instruments 1a and 4a on the one hand and instruments 1b, 2, 3a, 3b, 4b, 5, 6a and 6b according to the invention on the other.

The instruments had the following specifications:
Instrument 1a (not according to the invention) Write and read head comprising a 10 mW HeNe gas laser emitting light of wavelengths $\lambda_1$ and $\lambda_1' = 633$ nm, the light for writing the data being intensity-modulated by means of an acousto-optical modulator and that for reading in continuous wave mode being attenuated in output to 0.5 mW,
a polarizing beam splitter and
a λ/4 plate between polarizing beam splitter and recording layer.

Instrument 1b (according to the invention)
Write and read head as with instrument 1a except for the difference that the 80 /4 plate was rotatable about the optical axis and was lockable at angles of 0°, 45° and 90° relative to the plane of polarization $\bar{E}$ of the emitted plane polarized laser light.

Instrument 2 (according to the invention)
Write and read head comprising
a 10 mW HeNe gas laser as with instrument 1a and
a nonpolarizing beam splitter The head had no λ/4 plate, but was rotatable about the optical axis by an angle from 0° to 90° and was lockable at 0°, 45° and 90°.

Instrument 3a (according to the invention)
Write and read head as with instrument 2 except for the difference that a polarizing beam splitter was used.

Instrument 3b (according to the invention)
Write and read head as with instrument 3a, except for the difference that a λ/2 plate which was rotatable and lockable at an angle of 0°, 22.5° and 45° was situated between the polarizing beam splitter and the recording layer.

Instrument 4a (not according to the invention)
Write and read head as with instrument 1a, except for the difference that additionally
a 5 mW GaAlAs semiconductor laser ($\lambda_2' = 781$ nm) and
a dielectric beam splitter for combining the two laser beams
were present.

Instrument 4b (according to the invention)
Write and read head as with instrument 4a, except for the difference that the λ/4 plate was rotatable about the optical axis and lockable at an angle of 0°, 45° or 90° relative to the plane of polarization $\bar{E}$ of the emitted plane polarized light.

Instrument 5 (according to the invention)
Write and read head as with instrument 2, except for the difference that additionally
a 5 mW GaAlAs semiconductor laser ($\lambda_2' = 781$ nm) and
a dielectric beam splitter for combining the two laser beams
were present.

Instrument 6a (according to the invention)
Write and read head as with instrument 3a, except for the difference that additionally
a 5 mW GaAlAs semiconductor laser ($\lambda_2' = 781$ nm) and
a dielectric beam splitter
were present.

Instrument 6b (according to the invention)
Write and read head as with instrument 3b except for the difference that additionally
a 5 mW GaAlAs semiconductor laser ($\lambda_2' = 781$ nm) and
a dielectric beam splitter
were present.

All the instruments possess the customary optical, electric and mechanical devices for focusing the laser beams on the recording layer.

3.2 The test procedures 3.2.1 The determination of the sensitivity of recording layers comprising polymer (I, II)

Before the actual writing of the laser-optical data disks, first the sensitivity of the recording layers comprising polymer (I, II) was determined. The criterion here is the threshold energy density $\rho_s$ (nJ/μm²) of the laser light just sufficient to produce a clearly marked thermally altered spot in the recording layer. This threshold energy density was determined as follows:

The recording layer in homogeneous planar and tangential orientation on a data disk to the specification 2.4 (Example 2, Table 2) and the recording layer in homogeneous planar and radial orientation on a data disk to specification 2.10 (Example 2, Table 2) were irradiated with a focused pulsed dye laser beam of a wavelength λ = 633 nm and a pulse duration of 15 ns. The focusing of the laser beam was effected by means of a long-focus objective. The angle $\theta'$ between the plane of polarization $\bar{E}$ of the laser beam and the transition dipole moment $\vec{\mu}$ of the oriented dichroic component of polymer (I, II) was fixed at certain values from 0° to 90° by means of a λ/2 plate. Attenuation of the energy of the laser beam was used to produce in the layers spots of difference size whose diameters Φ were measured by means of a polarizing microscope. Squares of the diameters thus determined were plotted as a function of the natural logarithm of the associated total energies E (lnE) of the laser light. From the resulting straight line lnE/Φ² graph it was possible to determine the threshold energy densities $\rho_s$ for the writing process. The threshold energy densities were determined for both data disks at each of the fixed angles $\theta'$ of 0°, 22.5°, 45°, 67.5° and 90°. The test results can be found in Table 3.

TABLE 3

Threshold energy density ρs (nJ/μm²) of the recording layers on data disks to specifications 2.4 and 2.10 (Example 2, Table 2) and its dependence on the angle Θ'

| Angle Θ' (°) | Specification 2.4 ρs (nJ/μm²) | Specification 2.10 ρs (nJ/μm²) |
| --- | --- | --- |
| 0 | 0.25 | 0.27 |
| 22.5 | 0.37 | 0.38 |
| 45 | 0.38 | 0.39 |
| 67.5 | 0.56 | 0.58 |
| 90 | 0.62 | 0.63 |

The test results in Table 3 show that the laser-optical data disks have a particularly low threshold energy density $\rho_s$ vis-a-vis the write laser beam when the angle $\theta'$ between the plane of polarization $\vec{E}$ of the laser beam and the transition dipole moment $\mu$ of the oriented dichroic component is 0°. With this type of irradiation the data disks have a particularly high sensitivity which is far superior to that of conventional laser-optical data disks based on liquid-crystalline recording layers. Accordingly, the data disks according to the invention can be written with data at a particularly high speed.

3.2.2 The writing of the laser-optical data disks using the laser-optical write and read instruments 1a to 6b (see Example 3.1)

A set of data disks to specifications 2.1 to 2.10 (Example 2, Table 2) were written with data in the form of thermally altered areas (spots) on laser-optical write and read instruments 1a to 6b (see 3.1). In writing, the power output of the HeNe laser was always 10 mW and the write laser beams were guided in a relative motion over the data disks along circular paths while being directed perpendicular to the data disks and being focused on the respective recording layer.

As part of this exercise, each of the data disks to specifications 2.1 to 2.10 of the first set of data disks was written in succession by means of every one of the instruments 1a to 6b in such a way that each data disk had nine concentrically arranged rings each comprising 500 data tracks. For instance, data disks 2.3 and 2.4 were written as follows: ring 1 using instrument 1a, ring 2 using instrument 1b, ring 3 using instrument 2, ring 4 using instrument 3a, ring 5 using instrument 3b, ring 6 using instrument 4a, ring 7 using instrument 5, ring 8 using instrument 6a, ring 9 using instrument 6b. This experimental design made it possible to obtain accurate and unambigious comparisons between the individual instruments on the one hand and the individual data disks on the other.

The results of the investigations can be summarized as follows:

The duration of the laser pulse required for producing distinct spots was dependent not only on the particular instrument used but also on the setting of the degrees of freedom of the instrument. The degree of freedom of an instrument is understood here to mean the angle of the position of the write and read head as a whole or of the λ/4 or λ/2 plate relative to the recording layer of the data disk. This angle determines the angles $\theta$ and $\theta'$.

The highest sensitivities, i.e. the shortest laser pulse times for producing satisfactorily readable spots, were obtained on data disks 2.1 to 2.5, 2.9 and 2.10, while data disks 2.6 to 2.8, which had thicker recording layers, gave less satisfactory results. Moreover, the best results were obtained on writing with instruments 1b, 2, 3a, 3b, 4b, 5, 6a and 6b according to the invention, in particular when the degrees of freedom of the instrument were at the best settings, i.e. when the angle $\theta'$ was 0°. In the case of instruments 1b and 4b this was obtained by turning the λ/4 plate, in instruments 2, 3a, 5 and 6a by turning the write and read head as a whole and with instruments 3b and 6b by turning the λ/2 plate.

Using the instruments according to the invention, it was possible to produce satisfactorily readable spots at an angle of $\theta'=0°$ even with 250 ns pulses from a 10 mW laser, while a higher pulse duration was required at other angles $\theta'$. For instance, at an angle $\theta'=45°$ about 600 ns were necessary for a 10 mW laser and a $\theta'=90°$ even 1.5 μs at 10 mW.

If the customary instruments 1a and 4a were used, the sensitivity was appreciably less; in general, more than 600 ns were required in the case of a 10 mW laser. This illustrates the particular advantages resulting from using the process according to the invention, in particular when it is carried out with the aid of instruments according t the invention.

Once the best writing conditions had been decided, the second set of data disks to specifications 2.1 to 2.10 were written with data using instrument 3a. In writing the disks, it was necessary to increase the laser pulse duration in the case of data disks having thick recording layers in order to obtain spots of the same quality and the same diameter as in the case of data disks having thinner layers.

3.2.3 The reading of the laser-optical data disks using laser-optical write and read instruments 1a to 6b (see Example 3.1)

In reading the second set of data disks to specifications 2.1 to 2.10 (Example 2, Table 2) written as per 3.2.2 using instrument 3a, the read laser beam was guided in a relative motion over the data disks along the data track at a linear speed of 0.1 m/s while being perpendicularly incident thereupon and being focused on the recording layer thereof. In all cases the power level was 0.5 mW and the light analyzed was that reflected by the data disks.

The reflected light was incident upon an array of 4 photodiodes, the sum signal from which was conventionally amplified, measured and displayed on an oscilloscope.

The quality of reproduction was measured on the one hand in terms of the height of the signal $U_0$ which reproduces the background reflectivity of the thermally unaltered areas and on the other in terms of the height of the change in signal or of electrical contrast $\Delta U$ which represents the difference between the reflectivity of the thermally unaltered areas and that of the thermally altered areas.

3.2.3.1 The reading of the written data via the dichroism contrast

In the thermally altered areas (spots) of the data disks, the dichroism of the coloring component II in polymer (I, II), [Example 1] was reduced or even completely eliminated.

Reading the data tracks via the dichroism contrast required a read laser emitting light of the wavelength $\lambda_1'$ which was readily absorbed by the recording layers. Suitable for this purpose are in particular the instruments 1a, 1b, 2, 3a and 3b (see Example 3.1). These instruments each have only one laser which, however, emitted light of the suitable wavelength $\lambda_1 = 633$ nm. For read purposes, the power level was reduced from the original 10 mW to 0.5 mW by means of an attenuating filter.

The comparison between instruments 1a (not according to the invention), 1b, 2, 3a and 3b (all according to the invention) was carried out on the data disk to specification 2.3 (Example 2, Table 2) written with the aid of instrument 3a under optimal conditions ($\theta' = 0°$).

The results obtained can be summarized as follows:

Instruments 1a and 1b prove to be unsuitable for reading the spots; for if the $\lambda/4$ plate was at an angle of 45° relative to the plane of polarization $\vec{E}$ of the plane polarized light emitted by the laser, only circularly polarized light was incident on the data disk and no signal was obtained. If, however, the $\lambda/4$ plate in instrument 1b was set at an angle of 0° or 90° relative to the plane of polarization $\vec{E}$ of the laser light, then plane polarized light was transmitted by the $\lambda/4$ plate, so that, as with instruments 2, 3a, 3b, 5, 6a and 6b of Example 3.1 according to the invention, the $\lambda/4$ plate could have been omitted from the start. A strong signal would have then been obtainable with the aid of instrument 1b only if the write and read head thereof had from the outset been set in such a way as to produce an angle $\theta'$ of 0°. However, this was not the case, and subsequent correction of the angle was not possible by reason of the rigid read and write head.

Nor were instruments 3a and 3b suitable for reading the data via the dichroism contrast. It is true that the angle $\theta' = 0°$ or 90° was settable by turning the entire write and read head (instrument 3a) or by turning the $\lambda/2$ plate (instrument 3b), but the polarizing beam splitter present in these instruments did not deflect the reflected light to the detectors, so that no signal was obtained.

By contrast, instrument 2 was highly suitable for reading the dichroism contrast at $\theta = 0°$ or 90°, the most suitable angle being settable in a simple manner by turning the entire write and read head. It proved to be a particular advantage that, with the aid of instrument 2, a data disk could be written to very high sensitivity at an angle $\theta' = 0°$ and then, after the head had been turned by 90°, be read at an angle $\theta' = 90°$ with particularly good contrast and good background reflectivity. Background reflectivity is here to be understood as meaning the reflectivity of the unwritten areas. This reflectivity must not be too low since otherwise the autofocusing and track position correction means of the instrument are no longer fully functional.

The other data disks were therefore read using instrument 2.

The results obtained can be summarized as follows:

a) Reading the data disks at an angle of $\theta' = 0°$: The reflectivity of the thermally altered areas (background reflectivity) was generally low. Yet in the case of data disks to specifications 2.1 to 2.4, 2.9 and 2.10 (Example 2, Table 2) it was sufficiently high for the autofocusing and track position correction means to be fully functional. In the case of data disks to specifications 2.5 to 2.8, the background reflectivity was no longer high enough.

The reflectivity in the thermally altered areas was appreciably increased in all data disks, giving the appearance of bright spots against a dark background.

Contrast was satisfactory for example in the case of the data disk to specification 2.2 (d = 372 nm, A" = 0.49, A' = 0.076, CR = 6.44, S = 0.64, $|\Delta n| = 0.2$), which resulted in a particularly high positive change in the photodiode signal: $U_o = 0.12$ V, $\Delta U = U_{spot} - U_o = +0.37$ V.

b) Reading the data disks at an angle of $\theta' = 90°$: The background reflectivity of all data disks was high without exception, but decreased continuously with increasing layer thickness d from the data disk to specification 2.1 to the data disk to specification 2.9, so that at layer thicknesses d > 1000 nm (specification 2.5) the autofocusing and track position correction means were less responsive than in the case of layer thicknesses d < 1000 nm.

The reflectivity in the thermally altered areas was appreciably lower with all data disks, in particular in the case of those having layer thicknesses d < 1000 nm, resulting in the appearance of dark spots on a light background.

The contrast was particularly high for example in the case of the data disk to the specification 2.3 (d = 595 nm, A" = 1.54, A' = 0.24, CR = 6.41, $|\Delta n| = 0.21$), resulting in a particularly strongly negative change in the photodiode signal: $U_o = 0.76$ V, $\Delta U = -0.45$ V.

The reading of the data at an angle ' of 90° was thus particularly advantageous, on account of the higher background reflectivity and the resulting better response of the servo means, and made possible higher speeds of rotation of the disk drive.

3.2.3.2 Reading of data via the birefringence contrast

In the thermally altered areas (spots) of the recording layers, the high birefringence thereof was reduced or even completely eliminated.

In principle, reading via the birefringence contrast is possible not only with light of a readily absorbed wavelength $\lambda_1'$ but also with light of a poorly absorbed wavelength $\lambda_2'$.

Yet, if light of a read wavelength $\lambda_1' = 633$ nm was used, not only the signal $U_o$ corresponding to the background reflectivity but also the change in signal $\Delta U$ corresponding to the optical contrast were appreciably lower than if a read wavelength $\lambda_2'$ was used. Instruments 1a, 1b, 2, 3a and 3b (see Example 3.1) were therefore from the outset less suitable for reading via the birefringence contrast than the other instruments according to the invention.

(a) The comparison between instruments

The comparison of instruments 4a, 4b, 5, 6a and 6b (see Example 3.1) was carried out on a data disk to specification 2.4 (Example 2, Table 2) which had been written, in the manner of Example 3.2.2, with concentrically arranged rings each comprising 500 data tracks. The observations made on writing the data tracks using the individual instruments are also mentioned hereinafter. These observations confirmed once more the results presented in summary in Example 3.2.2.

Instrument 4a

Using this rigid instrument, having a $\lambda/4$ plate positioned at a fixed angle of 45° relative to the plane of polarization $\vec{E}$ of the emitted laser beam, the data disk was writable only to low sensitivity (pulse duration: not less than 600 ns), since under these conditions only circularly polarized laser light was incident upon the recording layer.

Reading ($\lambda_2' = 781$ nm) revealed a low background reflectivity ($U_o = 0.11$ V) and substantially positive photodiode signals (ΔU = +0.92 V), i.e. bright spots on a dark background.

Instrument 4b

For the writing operation ($\lambda_1' = 633$ nm), the $\lambda/4$ plate was locked at an angle of 0° relative to the plane of polarization $\bar{E}$ of the emitted plane polarized laser light, so that only plane polarized laser light was incident on the recording layer. Since, however, the plane of polarization $\bar{E}$ of the laser light was not at the best angle $\theta'$ of 0° relative to the transition dipole moment $\mu$ of the oriented dichroic coloring component I of the polymer (I, II), optimum sensitivity was not achieved (pulse duration: 500 ns). Subsequent correction of the position of the laser head was not possible.

For the reading operation, the $\lambda/4$ plate was turned about the optical axis by an angle of 45°, so that, as with instrument 4a, reading was performed with circularly polarized light. The resulting photodiode signals therefore also corresponded to those obtained with the aid of instrument 4a.

Instrument 5

On account of the polarization-independent beam splitter, the spots were not readable using instrument 5.

Instrument 6a

In the write and read head, the plane of polarization $\bar{E}$ of the two lasers was oriented parallel to the plane of the 100% transmission of the polarizing beam splitter. For the write operation, the entire head was oriented in such a way by turning about the optical axis that the write laser light was incident upon the recording layer at an angle of $\theta' = 0°$. The write sensitivity was very high. Even a pulse duration of 250 ns produced very easily readable spots.

For the read operation, the entire head was twisted in such a way that the plane polarized read laser light was incident upon the recording layer at an angle of $\theta' = 45°$. In this way, a signal $U_o$ of 1.18 V, corresponding to a particularly high background reflectivity, and a change in signal $\Delta U$ of $-1.07$ V, corresponding to a high optical contrast, were obtained.

Instrument 6b

With this instrument, the suitable conditions for writing ($\theta' = 0°$) and reading ($\theta = 45°$) were set by turning the $\lambda/2$ plate, and substantially the same results were obtained as with instrument 6a.

The comparison showed that instruments 6a and 6b gave the best results, these two instruments being equally satisfactory.

(b) The dependence of the signal height on the angle $\theta$

The investigation of the dependence of the height of the photodiode signal in reading on the angle $\theta$ was carried out using instrument 6a and ring 8 on the data disk. The experimental results can be found in Table 4.

TABLE 4

The dependence of the signal height on angle Θ (instrument 6a, ring 8 on data disk 2.4)

| Θ (°) | Background reflectivity photodiode signal $U_o$ (V) | Height of signal change $\Delta U$ caused by optical contrast (V) |
| --- | --- | --- |
| 0 | very low | not readable |
| 22.5 | 0.52 | −0.45 |
| 45 | 1.18 | −1.07 |

TABLE 4-continued

The dependence of the signal height on angle Θ (instrument 6a, ring 8 on data disk 2.4)

| Θ (°) | Background reflectivity photodiode signal $U_o$ (V) | Height of signal change $\Delta U$ caused by optical contrast (V) |
| --- | --- | --- |
| 90 | very low | not readable |

The results show that a high background reflectivity and a high optical contrast were obtained only for an angle $\theta = 45°$.

(c) The comparison between data disks to specifications 2.1 to 2.10 (Example 2, Table 2)

Again, this comparison was carried out using instrument 6a. To this end, the data disks of the second set which were written as per 3.2.2 using instrument 3a under optimal conditions were used, and the spots were read at an angle $\theta$ of 45°.

The experimental results can be found in Table 5. They show that the highest background reflectivities and optical contrasts were obtained in the case of data disks 2.4, 2.9 and 2.10, while data disks having thicker or thinner recording layers gave less satisfactory results.

TABLE 5

The comparison between data disks to specifications 2.1 to 2.10 (Example 2, Table 2) using instrument 6a

| Data disk to specification No. | Background reflectivity photodiode signal $U_o$ (V) | Height of signal change $\Delta U$ caused by optical contrast (V) |
| --- | --- | --- |
| 2.1 | too low | not readable |
| 2.2 | 0.32 | −0.28 |
| 2.3 | 0.61 | −0.56 |
| 2.4 | 1.18 | −1.07 |
| 2.5 | 0.88 | −0.81 |
| 2.6 | 0.60 | −0.55 |
| 2.7 | too low | not readable |
| 2.8 | 0.44 | −0.40 |
| 2.9 | 1.16 | −1.07 |
| 2.10 | 1.15 | −1.06 |

3.2.3.3 Reading by utilizing the interference of laser light waves

The thermally altered areas (spots) of the recording layers had a different refractive index ($n_{iso}$) than the thermally unaltered areas ($n_1$, $n_2$, $n_3$). The propagation velocities of light waves in these areas were therefore likewise different. Hence in the case of a light wave of Gaussian intensity distribution, those portions which propagated in the thermally altered areas were phase shifted compared with those portions which propagated in the thermally unaltered areas. If, then, the read laser beam was incident on a spot, the intensity of the reflected light was attenuated by interference of its phase shifted portions. This corresponds to a picture of dark spots against a bright background.

The data disks to specification 2.1 to 2.8 (Example 2, Table 2) written under optimal conditions as per Example 3.2.2 using instrument 2 were read, these data disks being used in effect as phase shift storage media.

The comparison between instruments 1a, 1b, 2, 3a, 3b, 4a, 4b, 5, 6a and 6b (see Example 3.1) was carried out in relation to data disk 2.6 and showed that in particular instruments 5, 6a and 6b were here suitable for reading.

Particularly good results were obtained by means of instrument 5.

The comparison between the data disks was therefore carried out using instrument 5.

The results obtained can be found in Table 6.

They show that the data disks were readable at an angle $\theta$ of 0° or 90°. They also show that of the data disks tested here those having thinner recording layers were less suitable for use as phase shift storage media than those having thicker layers.

TABLE 6

Reading of data disks to specifications 2.1 to 2.8
(Example 2, Table 2) by utilizing the interference of laser light waves, using instrument 5

| Data disk to specification No. | Angle $\Theta = 0°$ | | Angle $\Theta = 90°$ | |
|---|---|---|---|---|
| | $U_o$ (V) | $\Delta U$ (V) | $U_o$ (V) | $\Delta U$ (V) |
| 2.1 | too low | not readable | too low | not readable |
| 2.2 | too low | not readable | too low | not readable |
| 2.3 | 0.26 | −0.04 | too low | not readable |
| 2.4 | 0.24 | −0.04 | 0.24 | −0.02 |
| 2.5 | 0.25 | −0.11 | 0.25 | −0.04 |
| 2.6 | 0.24 | −0.15 | 0.24 | −0.08 |
| 2.7 | 0.24 | −0.19 | 0.23 | −0.12 |
| 2.8 | 0.25 | −0.15 | 0.25 | −0.13 |

We claim:

1. A method for improving a laser-optical write and read process whereby a thermally alterable recording layer which contains liquid-crystalline compounds in homogeneous planar orientation, is an optically monoaxial medium having refractive indices $n_1$ (perpendicular to the recording layer plane), $n_2$ (in the recording layer plane, perpendicular to the optical main axis), $n_3$ (in the recording layer plane, parallel to the optical main axis) and $n_{iso}$ (refractive index of the thermally altered areas) with $n_{iso} = \frac{1}{3}\, n_1 + n_2 + n_3$)

and which forms part of multilayer, sheetlike recording material, is written by means of a write laser beam with analogue or digital data in the form of thermally altered areas, whereafter the written data are read by determining the polarization-optical contrast between the thermally altered and the unaltered areas and/or utilizing for this purpose the interference of the light rays which form from the laser lightwaves in a Gaussian intensity distribution owing to the different phase velocities of the light in the center of thermally altered areas on the one hand and their thermally unaltered surroundings on the other hand, thereby analyzing the light transmitted or reflected by the recording material, the said method comprising the steps of (1) measuring the said refractive indices $n_1$, $n_2$, $n_3$ and $n_{iso}$ of different liquid-crystalline compounds in homogeneous planar orientation employing light of a wavelength $\lambda = 780$ nm, (2) selecting those liquid-crystalline compounds whose refractive indices $n_1$, $n_2$, $n_3$ and $n_{iso}$ are subject to the relations $n_1 = n_2 < n_3$ or $n_1 = n_2 > n_3$ and $|\Delta n| = |n_3 - n_2| > 0.05$ or $|\Delta n| = |n_{iso} - n_2| > 0.05$ or alternatively $|\Delta n| = |n_{iso} - n_3| > 0.05$ from the group of liquid-crystalline compounds whose refractive indices $n_1$, $n_2$, $n_3$ and $n_{iso}$ of light of a wavelength $\lambda = 780$ nm have been measured, for purposes of preparing the said thermally alterable recording layer, (3) adjusting the thickness d of thermally alterable recording layer prepared from the said selected liquid-crystalline compounds in the range of from 0.05 $\lambda'/|\Delta n|$ to 0.6 $\lambda'/|\Delta n|$ where $\lambda'$ is the wavelength of the read laser light, or, in the alternative, (4) either adjusting the wavelength $\lambda'$ of the read laser light in the wavelength range of from 1.66 d $|\Delta n|$ to 5 d $|\Delta n|$ where d is the thickness of the thermally alterable recording layer, in the event that the light transmitted by the recording material is analyzed, or adjusting the wavelength $\lambda'$ of the read laser light in the wavelength range of from 3.33 d $|\Delta n|$ to 20 d $|\Delta n|$ where d is the thickness of the thermally alterable recording layer, in the event that the light reflected by the recording material is analyzed, and, thereafter, (5) adjusting the plane of polarization $\vec{E}$ of the read laser beam which is guided over the recording material in a relative motion in the direction of the optical main axis of the recording layer or perpendicular thereto in such a way that, upon incidence of the read laser beam on the recording layer, the plane of polarization $\vec{E}$ forms an angle $\theta$ of 0°±10°, 45°±10° or 90°±10° with the optical main axis of the recording layer.

2. A laser-optical write and read apparatus, used in a method for improving a laser-optical write and read process, which comprises: (a) disk drive, (b) a laser-optical write and read head having a laser light source or a plurality of laser light sources for laser light of different wavelengths and, in the beam of the laser light, a dielectric beam splitter for combining laser beams of different wavelengths, and a polarizing beam splitter or a substantially nonpolarizing beam splitter and a means for reading analog or digital data written in the form of thermally altered areas on a thermally altered recording layer, and (c) a thermally alterable recording layer which contains liquid-crystalline compounds in homogeneous planar orientation being an optically monoaxial medium having refractive indices $n_1$ (perpendicular to the recording layer plane), $n_2$ (in the recording layer plane, perpendicular to the optical main axis), $n_3$ (in the recording layer plane, parallel to the optical main axis) and $n_{iso}$ (refractive index of the thermally altered areas) with $n_{iso} = \frac{1}{3}\, n_1 + n_2 + n_3$)

and which forms part of multilayer, sheetlike recording material, wherein said thermally alterable recording layer is written by means of a write laser beam from said laser-optical write and read head wherein the said laser-optical write and read head is mounted to be rotatable by an angle of 0° to 90° about the axis defined by the direction of propagation of the laser light, and there are provided means for locking the said head at 0°, 45° and 90° with analogue or digital data in the form of thermally altered areas, whereafter the written data are read using the read means of said laser optical write and read head, by determining the polarization-optical contrast between the thermally altered and unaltered areas and/or utilizing for this purpose the interference of the light rays which form from the laser lightwave in a Gaussian intensity distribution owing to the different phase velocities of the light in the center of thermally altered areas on the one hand and their thermally unaltered surroundings on the other hand, thereby analyzing the light transmitted or reflected by the recording material, and wherein the said method comprises the steps of (1) measuring the said refractive indices $n_1$, $n_2$, $n_3$ and $n_{iso}$ of different liquid-crystalline compounds in homogeneous planar orientation employing light of a wavelength $\lambda = 780$ nm, (2) selecting those liquid-crystalline compounds whose refractive indices $n_1$, $n_2$, $n_3$ and $n_{iso}$ are subject to the relations $n_1 = n_2 < n_3$ or $n_1 = n_2 > n_3$ and $|\Delta n| = |n_3 - n_2| > 0.05$ or $|\Delta n| = |n_{iso} - n_2| > 0.05$ or alternatively $|\Delta n| = |n_{iso} - n_3| > 0.05$ from the group of liquid-crystalline compounds whose refractive indices $n_1$, $n_2$, $n_3$ and $n_{iso}$ of light of a wavelength $\lambda = 780$ nm have been measured, for purposes of preparing the said thermally alterable recording layer, (3) adjusting the thickness d of thermally alterable recording layer prepared from the said selected liquid-crystalline compounds in the range of from $0.05 \, \lambda'/|\Delta n|$ to $0.6 \, \lambda'/|\Delta n|$ where $\lambda'$ is the wavelength of the read laser light, or, in the alternative, (4) either adjusting the wavelength $\lambda'$ of the read laser light in the wavelength range of from $1.66 \, d \, |\Delta n|$ to $5 \, d \, |\Delta n|$ where d is the thickness of the thermally alterable recording layer, in the event that the light transmitted by the recording material is analyzed, or adjusting the wavelength $\lambda'$ of the read laser light in the wavelength range of from $3.33 \, d \, |\Delta n|$ to $20 \, d \, |\Delta n|$ where d is the thickness of the thermally alterable recording layer, in the event that the light reflected by the recording material is analyzed, and, thereafter, (5) adjusting the plane of polarization $\vec{E}$ of the read laser beam which is guided over the recording material in a relative motion in the direction of the optical main axis of the recording layer or perpendicular thereto in such a way that, upon incidence of the read laser beam on the recording layer, the plane of polarization $\vec{E}$ forms an angle $\theta$ of $0° \pm 10°$, $45° \pm 10°$ or $90° \pm 10°$ with the optical main axis of the recording layer.

3. The laser-optical write and read apparatus of claim 2, wherein a $\lambda/4$ plate is present in the beam path between the polarizing beam splitter or the substantially nonpolarizing beam splitter and the recording layer, where the said $\lambda/4$ plate is mounted so as to be rotatable about the optical axis by an angle of from 0° to $\pm 45°$ relative to the plane of polarization $\vec{E}$ of the emitted planar polarized laser light and there are provided means for locking the said plate at 0°, $\pm 22.5°$ and $\pm 45°$.

4. The laser-optical write and read instrument of claim 3, wherein a $\lambda/2$ plate is also present in the beam path between the polarizing beam splitter or the substantially nonpolarizing beam splitter and the recording layer, where the said $\lambda/4$ plate or the said $\lambda/2$ plate or both of the said plates are mounted so as to be rotatable about the optical axis by an angle from 0° to $\pm 45°$ relative to the plane of polarization $\vec{E}$ of the emitted planar polarized laser light and there are provided means for locking the said plate(s) at 0°, $\pm 22.5°$ and $\pm 45°$.

5. The laser-optical write and read apparatus of claim 3, further comprising a multilayer laser-optical data disk containing a recording layer which (1) contains liquid-crystalline compounds in homogeneous planar and tangential orientation of homogeneous planar and radial orientation, (2) is an optically monoaxial medium whose refractive indices $n_1$, $n_2$, $n_3$ and $n_{iso}$ of light of wavelength $\lambda = 780$ nm are subject to the relations $n_1 = n_2 < n_3$ or $n_1 = n_2 > n_3$ and $|\Delta n| = |n_3 - n_2| > 0.05$ or $|\Delta n| = |n_{iso} - n_2| > 0.05$ or alternatively $|\Delta n| = |n_{iso} - n_3| > 0.05$ and (3) has a thickness d in the range of from $0.05 \, \lambda'/|\Delta n|$ to $0.6 \, \lambda'/|\Delta n|$ where $\lambda'$ is the wavelength of the read laser light.

6. The laser-optical write and read apparatus of claim 2, wherein a $\lambda/2$ plate is present in the beam path between the polarizing beam splitter or the substantially nonpolarizing beam splitter and the recording layer, where the said $\lambda/2$ plate is mounted so as to be rotatable about the optical axis by an angle from 0° to $\pm 45°$ relative to the plane of polarization $\vec{E}$ of the emitted planar polarized laser light and there are provided means for locking the said plate at 0°, $\pm 22.5°$ and $\pm 45°$.

7. The laser-optical write and read apparatus of claim 6, further comprising a multilayer laser-optical data disk containing a recording layer which (1) contains liquid-crystalline compounds in homogeneous planar and tangential orientation of homogeneous planar and radial orientation, (2) is an optically monoaxial medium whose refractive indices $n_1$, $n_2$, $n_3$ and $n_{iso}$ of light of wavelength $\lambda = 780$ nm are subject to the relations $n_1 = n_2 < n_3$ or $n_1 = n_2 > n_3$ and $|\Delta n| = |n_3 - n_2| > 0.05$ or $|\Delta n| = |n_{iso} - n_2| > 0.05$ or alternatively $|\Delta n| = |n_{iso} - n_3| > 0.05$ and (3) has a thickness d in the range of from $0.05 \lambda'/|\Delta n|$ to $0.6 \lambda'/|\Delta n|$ where $\lambda'$ is the wavelength of the read laser light.

8. The laser-optical write and read apparatus of claim 2, further comprising a multilayer laser-optical data disk, containing a recording layer which
  (1) contains liquid-crystalline compounds in homogeneous planar and tangential orientation of homogeneous planar and radial orientation,
  (2) is an optically monoaxial medium whose refractive indices $n_1$, $n_2$, $n_3$ and $n_{iso}$ of light of wavelength $\lambda = 780$ nm are subject to the relations $n_1 = n_2 < n_3$ or $n_1 = n_2 > n_3$ and $|\Delta n| = |n_3 - n_2| > 0.05$ or $|\Delta n| = |n_{iso} - n_2| > 0.05$ or alternatively $|\Delta n| = |n_{iso} - n_3| > 0.05$ and (3) has a thickness d in the range of from $0.05 \lambda'/|\Delta n|$ to $0.6 \lambda'/|\Delta n|$ where $\lambda'$ is the wavelength of the read laser light.

9. A laser-optical write and read process whereby a thermally alterable recording layer which contains liquid-crystalline compounds in homogeneous planar orientation and oriented, dichroic, coloring components and forms part of a multilayer, sheetlike recording material is written by means of a write laser beam with analogue or digital data in the form of thermally altered areas, whereafter the written data are read by means of a read laser beam by analyzing the light transmitted or reflected by the recording material, which comprises
  (1) directing the write laser beam in such a way that the plane of polarization $\vec{E}$ of the said beam, upon incidence on the recording layer, forms an angle $\theta'$ from $-45°$ to $+45°$ with the transition dipole moment $\vec{\mu}$ of the said oriented dichroic components,
  (2) reading the data by determining the polarization-optical contrast between the thermally altered and the unaltered areas and/or utilizing for this purpose the interference to the light rays which form from the laser lightwaves in a Gaussian intensity distribution owing to the different phase velocities of the light in the center of thermally altered areas on the one hand and their thermally unaltered surroundings on the other,
  (3) using a recording layer which is optically monoaxial medium whose refractive indices
    $n_1$ (perpendicular to the recording layer plane),
    $n_2$ (in the recording layer plane, perpendicular to the optical main axis) and
    $n_3$ (in the recording layer plane, parallel to the optical main axis) and
    $n_{iso}$ (refractive index of the thermally altered areas) with $n_{iso} = \frac{1}{3}(n_1 + n_2 + n_3)$ for light of the wavelength $\lambda = 780$ nm are subject to the relations $n_1 = n_2 < n_3$ or $n_1 = n_2 > n_3$ and $|\Delta n| = |n_3 - n_2| > 0.05$ or $|\Delta n| = |n_{iso} - n_2| > 0.05$ or alternatively $|\Delta n| = |n_{iso} - n_3| > 0.05$ and which has a thickness d in the range of from $0.05 \lambda'/|\Delta n|$ to $0.6 \lambda'/|\Delta n|$ where $\lambda'$ is the wavelength of the read laser light,
  (4) guiding the read laser beam over the recording material in a relative motion in the direction of the optical main axis of the recording layer or perpendicular thereto in such a way that the plane of polarization $\vec{E}$ of the read laser beam, upon incidence on the recording layer, forms an angle $\theta$ of $0° \pm 10°$, $45° \pm 10°$ or $90° \pm 10°$ with the optical main axis of the recording layer, and
  (5) using a read laser beam of light of a wavelength $\lambda'$ in the range of from $1.66 d |\Delta n|$ to $5 d |\Delta n|$, where d is the thickness of the recording layer, and analyzing the light transmitted by the recording material, or, in the alternative, using a read laser beam of light of a wavelength $\lambda'$ in the range of from $3.33 d |\Delta n|$ to $20 d |\Delta n|$, where d is the thickness of the recording layer and analyzing the light reflected by the recording material.

10. A laser-optical write and read apparatus, used in a laser-optical write and read process which comprises:
  (a) a disk drive
  (b) a laser-optical write and read head comprising a laser light source or a plurality of laser light sources for laser light of different wavelengths and, in the beam of the laser light, a dielectric beam splitter for combining laser beams of different wavelengths, and a polarizing beam splitter or a substantially nonpolarizing beam splitter and a means for reading analog or digital data written in the form of thermally altered areas on a thermally altered recording layer, and
  (c) a thermally alterable recording layer which contains liquid-crystalline compounds in homogeneous planar orientation and oriented, dichroic, coloring components and forms part of a multilayer, sheetlike recording material,
  wherein said thermally alterable recording layer is written by means of a write laser beam from said laser-optical write and read head with analogue or digital data in the form of thermally altered areas, whereafter the written data are read using the read means of said laser-optical write and read head by analyzing the light transmitted or reflected by the recording material,
  wherein said laser-optical write and read head is mounted to be rotatable by any angle from $0°$ to $90°$ about the optical axis defined by the direction of propagation of the laser light, and there are provided means for locking the said head at $0°$, $45°$ and $90°$ and wherein the said process comprises the steps of
(1) directing the write laser beam in such a way that the plane of polarization $\vec{E}$ of the said beam, upon incidence on the recording layer, forms an angle $\theta'$ from $-45°$ to $+4520$ with the transition dipole moment $\mu$ of the said oriented dichroic components,
(2) reading the data by determining the polarization-optical contrast between the thermally altered and the unaltered areas and/or utilizing for this purpose the interference to the light rays which form from the laser lightwaves in a Gaussian intensity distribution owing to the different phase velocities of the light in the center of thermally altered areas on the one hand and their thermally unaltered surroundings on the other,
(3) using a recording layer which is optically monoaxial medium whose refractive indices
$n_1$ (perpendicular to the recording layer plane),
$n_2$ (in the recording layer plane, perpendicular to the optical main axis),
$n_3$ (in the recording layer plane, parallel to the optical main axis) and
$n_{iso}$ (refractive index of the thermally altered areas) with $n_{iso} = \frac{1}{3}(n_1+n_2+n_3)$
for light of the wavelength $\lambda = 780$ nm are subject to the relations $n_1 = n_2 < n_3$ or $n_1 = n_2 > n_3$ and $|\Delta n| = |n_3 - n_2| > 0.05$ or $|\Delta n| = |n_{iso} - n_2| > 0.05$ or alternatively $|\Delta n| = |n_{iso} - n_3| > 0.05$ and which has a thickness d in the range of from 0.05 $\lambda'/|\Delta n|$ to 0.6 $\lambda'/|\Delta n|$ where $\lambda$ is the wavelength of the read laser light,
(4) guiding the read laser beam over the recording material in a relative motion in the direction of the optical main axis of the recording layer or perpendicular thereto in such a way that the plane of polarization $\vec{E}$ of the read laser beam, upon incidence on the recording layer, forms an angle $\theta$ of $0° \pm 10°$, $45° \pm 10°$ or $90° \pm 10°$ with the optical main axis of the recording layer, and
(5) using a read laser beam of light of a wavelength $\lambda'$ in the range of from 1.66 d $|\Delta n|$ to 5 d $|\Delta n|$, where d is the thickness of the recording layer, and analyzing the light transmitted by the recording material, or, in the alternative, using a read laser beam of light of a wavelength $\lambda'$ in the range of from 3.33 d $|\Delta n|$ to 20 d $|\Delta n|$, where d is the thickness of the recording layer and analyzing the light reflected by the recording material.

11. The laser-optical write and read apparatus of claim 10, wherein a $\lambda/4$ plate is present in the beam path between the polarizing beam splitter or the substantially nonpolarizing beam splitter and the recording layer, where the said $\lambda/4$ plate is mounted so as to be rotatable about the optical axis by an angle from 0° to ±45° relative to the plane of polarization $\vec{E}$ of the emitted planar polarized laser light and there are provided means for locking said plate at 0°, ±22.5° and ±45°.

12. The laser-optical write and read apparatus of claim 11, wherein a $\lambda/2$ plate is present in the beam path between the polarizing beam splitter or the substantially nonpolarizing beam splitter and the recording layer, where the said $\lambda/4$ plate or the said $\lambda/2$ plate or both of the said plates are mounted so as to be rotatable about the optical axis by an angle from 0° to ±45° relative to the plane of polarization $\vec{E}$ of the emitted planar polarized laser light and there are provided means for locking said plate(s) at 0°, ±22.5° and ±45°.

13. The laser-optical write and read apparatus of claim 11, further comprising a multilayer laser-optical data disk containing a recording layer which
(1) contains liquid-crystalline compounds in homogeneous planar and tangential orientation of homogeneous planar and radial orientation and oriented, dichroic, colored components,
(2) is an optically monoaxial medium whose refractive indices $n_1$, $n_2$, $n_3$ and $n_{iso}$ of light of wavelength $\lambda = 780$ nm are subject to the relations $n_1 = n_2 < n_3$ or $n_1 = n_2 > n_3$ and $|\Delta n| = |n_3 - n_2| > 0.05$ or $|\Delta n| = |n_{iso} - n_2| > 0.05$ or alternatively $|\Delta n| = |n_{iso} - n_3| > 0.05$ and (3) has a thickness d in the range of from 0.05 $\lambda'/|\Delta n|$ to 0.6 $\lambda'/|\Delta n|$ where $\lambda'$ is the wavelength of the read laser light.

14. The laser-optical write and read apparatus of claim 10, wherein a $\lambda/2$ plate is present in the beam path between the polarizing beam splitter or the substantially nonpolarizing beam splitter and the recording layer, where the said $\lambda/2$ plate is mounted so as to be rotatable about the optical axis by an angle from 0° to ±45° relative to the plane of polarization $\vec{E}$ of the emitted planar polarized laser light and there are provided means for locking said plate at 0°, ±22.5° and ±45°.

15. The laser-optical write and read apparatus of claim 14, further comprising a multilayer laser-optical data disk containing a recording layer which
(1) contains liquid-crystalline compounds in homogeneous planar and tangential orientation of homogeneous planar and radial orientation and oriented, dichroic, colored components,
(2) is an optically monoaxial medium whose refractive indices $n_1$, $n_2$, $n_3$ and $n_{iso}$ of light of wavelength $\lambda = 780$ nm are subject to the relations $n_1 = n_2 < n_3$ or $n_1 = n_2 > n_3$ and $|\Delta n| = |n_3 - n_2| > 0.05$ or $|\Delta n| = |n_{iso} - n_2| > 0.05$ or alternatively $|\Delta n| = |n_{iso} - n_3| > 0.05$ and (3) has a thickness d in the range of from 0.05 $\lambda'/|\Delta n|$ to 0.6 $\lambda'/|\Delta n|$ where $\lambda'$ is the wavelength of the read laser light.

16. The laser-optical write and read apparatus of claim 10, further comprising a multilayer laser-optical data disk containing a recording layer which
   (1) contains liquid-crystalline compounds in homogeneous planar and tangential orientation of homogeneous planar and radial orientation and oriented, dichroic, colored components,
   (2) is an optically monoaxial medium whose refractive indices $n_1$, $n_2$, $n_3$ and $n_{iso}$ of light of wavelength $\lambda = 780$ nm are subject to the relations $n_1 = n_2 < n_3$ or $n_1 = n_2 > n_3$ and $|\Delta n| = |n_3 - n_2| > 0.05$ or $|\Delta n| = |n_{iso} - n_2| > 0.05$ or alternatively $|\Delta n| = |n_{iso} - n_3| > 0.05$ and (3) has a thickness d in the range of from $0.05 \, \lambda'/|\Delta n|$ to $0.6 \, \lambda'/|\Delta n|$ where $\lambda'$ is the wavelength of the read laser light.

17. A multilayer laser-optical data disk containing a recording layer which
   (1) contains liquid-crystalline compounds in homogeneous planar and tangential orientation or homogeneous planar and radial orientation and oriented, dichroic, colored components,
   (2) is an optically monoaxial medium whose refractive indices $n_1$ (perpendicular to the recording layer plane), $n_2$ (in the recording layer plane, perpendicular to the optical axis), $n_3$ (in the recording layer plane, parallel to the optical main axis), and $n_{iso}$ (refractive index of the thermally altered areas with $n_{iso} = \frac{1}{3}(n_1 + n_2 + n_3)$ of light of wavelength $\lambda = 780$ nm are subject to the relations $n_1 = n_2 < n_3$ or $n_1 = n_2 > n_3$ and $|\Delta n| = |n_3 - n_2| > 0.05$ or $|\Delta n| = |n_{iso} - n_2| > 0.05$ or alternatively $|\Delta n| = |n_{iso} - n_3| > 0.05$ and (3) has a thickness d in the range of from $0.05 \, \lambda'/|\Delta n|$ to $0.6 \, \lambda'/|\Delta n|$ where $\lambda'$ is the wavelength of the read laser light.

* * * * *

UNITED STATES PATENT AND TRADEMARK OFFICE
CERTIFICATE OF CORRECTION

PATENT NO. : 5,097,463
DATED : March 17, 1992
INVENTOR(S) : WAGENBLAST et al.

It is certified that error appears in the above-identified patent and that said Letters Patent is hereby corrected as shown below:

Claim 2, column 34, line 64, "$1/3n_1$" should read --$1/3(n_1$--.

Claim 9, column 37, line 63, "which is optically" should read --which is an optically--.

Claim 10, column 39, line 5, "+4520" should read --45--.

line 42, before "is" insert --'--.

Claim 17, column 42, line 8, "optical axis" should read --optical main axis--.

Signed and Sealed this

Twentieth Day of July, 1993

Attest:

MICHAEL K. KIRK

Attesting Officer    Acting Commissioner of Patents and Trademarks